(12) United States Patent
Cook et al.

(10) Patent No.: US 7,793,498 B2
(45) Date of Patent: Sep. 14, 2010

(54) INTEGRATED CHARGE AIR COOLER AND EXHAUST GAS RECIRCULATION MIXER

(75) Inventors: Anthony J. Cook, Fort Wayne, IN (US); Steven W. Inniger, Hoagland, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 671 days.

(21) Appl. No.: 11/460,284

(22) Filed: Jul. 27, 2006

(65) Prior Publication Data

US 2008/0022676 A1   Jan. 31, 2008

(51) Int. Cl.
*F02B 33/44* (2006.01)
*F02M 25/07* (2006.01)

(52) U.S. Cl. .................. 60/605.2; 123/568.12

(58) Field of Classification Search ............... 60/605.2; 123/568.12, 568.16, 568.2, 568.21, 563
See application file for complete search history.

(56) References Cited

U.S. PATENT DOCUMENTS

| | | |
|---|---|---|
| 6,216,458 B1 | 4/2001 | Alger |
| 6,412,278 B1 * | 7/2002 | Matthews .................. 60/605.1 |
| 6,786,210 B2 | 9/2004 | Kennedy et al. |
| 7,011,080 B2 * | 3/2006 | Kennedy ............... 123/568.12 |
| 2004/0079079 A1 * | 4/2004 | Martin et al. .............. 60/605.2 |
| 2005/0056263 A1 | 3/2005 | Kennedy |
| 2007/0261400 A1 | 11/2007 | Digele |

FOREIGN PATENT DOCUMENTS

| | | |
|---|---|---|
| DE | 102005039137 | 8/2004 |
| FR | 2856746 A1 | 6/2003 |
| FR | 2859747 A1 | 11/2003 |
| WO | 2006/040053 A1 | 5/2006 |

OTHER PUBLICATIONS

EP Search Report dated Dec. 18, 2007.

* cited by examiner

*Primary Examiner*—Hoang M Nguyen
(74) *Attorney, Agent, or Firm*—Jeffrey P. Calfa; Mark C. Bash; Gerald W. Askew

(57) ABSTRACT

A vehicle charge air cooler having an exhaust gas recirculation mixer integrated into the inlet, inlet manifold, outlet, or outlet manifold takes advantage of the incremental tooling opportunities associated with those components, as well as reducing the number of components and potential leak points in the exhaust gas recirculation system.

9 Claims, 18 Drawing Sheets

ENGINE WITH CHARGE AIR COOLER WITH INTEGRATED EGR MIXER IN CAC INTAKE, HAVING AN EGR GAS TO COOLANT HEAT EXCHANGER

ENGINE WITH CHARGE AIR COOLER AND PRIOR ART EXHAUST GAS RECIRCULATION SYSTEM

ENGINE WITH CHARGE AIR COOLER AND PRIOR ART EXHAUST GAS RECIRCULATION SYSTEM WITH MIXER PRIOR TO CAC

CHARGE AIR COOLER WITH EXHAUST
GAS RECIRCULATION MIXER INTEGRATED
INTO INLET MANIFOLD

CHARGE AIR COOLER WITH EXHAUST
GAS RECIRCULATION MIXER INTEGRATED
INTO INTAKE

CHANGE AIR COOLER WITH EXHAUST GAS RECIRCULATION MIXER INTEGRATED INTO OUTLET MANIFOLD

CHARGE AIR COOLER WITH EXHAUST
GAS RECIRCULATION MIXER INTEGRATED
INTO OUTLET

ENGINE WITH CHARGE AIR COOLER WITH INTEGRATED EGR MIXER IN CAC INTAKE, HAVING NO EGR GAS TO COOLANT HEAT EXCHANGER

ENGINE WITH CHARGE AIR COOLER WITH INTEGRATED EGR MIXER IN CAC INLET MANIFOLD, HAVING NO EGR GAS TO COOLANT HEAT EXCHANGER

ENGINE WITH CHARGE AIR COOLER WITH INTEGRATED EGR MIXER IN CAC INTAKE, HAVING AN EGR GAS TO COOLANT HEAT EXCHANGER

ENGINE WITH CHANGE AIR COOLER WITH INTEGRATED EGR MIXER IN CAC INLET MANIFOLD, HAVING AN EGR GAS TO COOLANT HEAT EXCHANGER

ENGINE WITH CHARGE AIR COOLER WITH INTEGRATED EGR MIXER IN CAC OUTLET, HAVING AN EGR GAS TO COOLANT HEAT EXCHANGER

ENGINE WITH CHARGE AIR COOLER WITH
INTEGRATED EGR MIXER IN CAC OUTLET
MANIFOLD, HAVING AN EGR GAS
TO COOLANT HEAT EXCHANGER

ENGINE WITH CHARGE AIR COOLER WITH
INTEGRATED EGR MIXER IN CAC INTAKE,
HAVING EGR BYPASS AND SECOND
INTEGRATED EGR MIXER IN CAC OUTLET

ENGINE WITH CHARGE AIR COOLER WITH INTEGRATED EGR MIXER IN CAC INTAKE MANIFOLD, HAVING EGR BYPASS AND SECOND INTEGRATED EGR MIXER IN CAC OUTLET MANIFOLD

ENGINE WITH CHARGE AIR COOLER WITH
INTEGRATED EGR MIXER IN CAC INTAKE,
HAVING EGR BYPASS AND SECOND
INTEGRATED EGR IN CAC OUTLET MANIFOLD

ENGINE WITH CHARGE AIR COOLER WITH INTEGRATED EGR MIXER IN CAC INTAKE MANIFOLD, HAVING EGR BYPASS AND SECOND INTEGRATED EGR MIXER IN CAC OUTLET

ENGINE WITH CHARGE AIR COOLER WITH INTEGRATED EGR MIXER AND VENTURI IN CAC INTAKE

ENGINE WITH CHARGE AIR COOLER WITH INTEGRATED EGR MIXER AND RECIRCULATION CONTROL VALVE IN CAC INTAKE

INTEGRATED CHARGE AIR COOLER AND EXHAUST GAS RECIRCULATION MIXER

BACKGROUND OF THE INVENTION

1.—Field of the Invention

This invention relates to the use of a vehicle Charge Air Cooler (CAC) having an integrated Exhaust Gas Recirculation (EGR) mixer. The integrated Exhaust Gas Recirculation mixer is located either at the inlet, at the inlet manifold, at the outlet, or at the outlet manifold of the Charge Air Cooler. The vehicle Charge Air Cooler having an integrated Exhaust Gas Recirculation mixer may be utilized in a vehicle employing a conventional air to coolant Exhaust Gas Recirculation cooler, or may be used as the sole means of Exhaust Gas Recirculation cooling.

2.—Description of the Related Art

Multiple cylinder internal combustion reciprocating engines used in ground traveling vehicles operate by drawing in ambient intake air, compressing the air, injecting fuel to create a fuel air mixture, igniting the fuel air mixture, extracting work as the heated combustion byproducts expand, and exhausting the combustion byproducts to the surrounding environment. Ignition of the fuel air mixture in an internal combustion reciprocating engine employing the air standard Otto cycle is achieved by means of a spark plug. Internal combustion reciprocating engines employing the air standard Diesel cycle achieve auto-ignition due to the heat of compression of the fuel air mixture. In order to improve performance and operating efficiency, internal combustion reciprocating engines of both the air standard Otto cycle type and the air standard Diesel cycle type commonly utilize a turbocharger. The turbocharger extracts additional work energy from the exhaust gases of the internal combustion reciprocating engine by means of a turbine through which the exhaust gases are made to flow. The turbocharger is typically mounted directly to the exhaust manifold of the internal combustion reciprocating engine in close-coupled proximity to the exhaust outlets for efficient operation of the turbine. The extracted mechanical energy drives a compressor, which compressor increases the pressure of the ambient air drawn into the internal combustion reciprocating engine.

Due to the compression of the ambient intake air associated with the use of a turbocharger, and the resulting increase in temperature thereof, ground traveling vehicles commonly utilize an air to air heat exchanger, which is referred to as a Charge Air Cooler (CAC). The Charge Air Cooler is located separately from and forward of the internal combustion reciprocating engine. The intake air is conducted from the outlet of the turbocharger to the inlet of the Charge Air Cooler by a pipe or conduit, which pipe or conduit is connected to both the turbocharger and to the Charge Air Cooler by flexible rubber cuffs or hoses. In this way, relative movement between the internal combustion reciprocating engine and the Charge Air Cooler is accommodated. Another pipe or conduit conducts the compressed and cooled intake air from the outlet of the Charge Air Cooler to the intake manifold of the internal combustion reciprocating engine. The Charge Air Cooler itself is generally constructed in such a way that there is an inlet manifold and an outlet manifold. The inlet manifold and the outlet manifold of the Charge Air Cooler are connected by smaller cooling passages, which smaller cooling passages are separated by a distance sufficient for the passage of external cooling air therebetween. The inlet manifold is provided with an inlet opening to which the aforementioned pipe from the turbocharger is connected. The outlet manifold is in the same way provided with an outlet opening to which the aforementioned pipe to the intake manifold of the internal combustion reciprocating engine is connected.

The combustion of the fuel air mixture in an internal combustion reciprocating engine results in combustion byproducts, as noted previously. These byproducts primarily consist of carbon dioxide and water vapor. However, there are myriad other chemical constituents, such as hydrocarbons and oxides of nitrogen. Many of these are undesirable from an environmental standpoint, and therefore measures are taken to reduce their formation and emission. A commonly employed method to reduce internal combustion reciprocating engine emissions is Exhaust Gas Recirculation (EGR). A typical embodiment of Exhaust Gas Recirculation involves a pipe that conducts a portion of the exhaust gases from the exhaust manifold to a mixer pipe located between the Charge Air Cooler outlet and the intake manifold of the internal combustion reciprocating engine. A valve may or may not be employed to control the amount of exhaust gas that is recirculated, and the conditions under which the exhaust gas is allowed to do so. Due to the fact that the exhaust gases are under backpressure prior to their further expansion in the turbine of the turbocharger, Exhaust Gas Recirculation may operate passively, requiring no pump. Often the mixer pipe that is utilized incorporates a venturi to increase the flow of exhaust gas from the exhaust manifold to the intake manifold. Some advanced Exhaust Gas Recirculation systems utilize a turbocharger with variable geometry turbine blades to artificially increase the exhaust gas backpressure in order to further increase the flow of exhaust gas from the exhaust manifold to the intake manifold.

Exhaust gases and combustion byproducts leaving the internal combustion reciprocating engine cylinders do so at extremely high temperatures. Therefore, it is common to provide a gas to liquid heat exchanger, which transfers some of the heat from the exhaust gas to the engine coolant, prior to the introduction of the exhaust gas to the intake air at the exhaust gas recirculation mixer. It is also known to configure the system such that the mixer is located between the turbocharger intake air outlet and the Charge Air Cooler inlet. An example of a system configured in this way may be found in U.S. Pat. No. 6,786,210. It is also known, as in U.S. Pat. No. 6,786,210, to provide a bypass circuit within the Charge Air Cooler, in order to prevent condensation of corrosive combustion byproducts within the Charge Air Cooler under certain operating conditions.

SUMMARY OF THE INVENTION

In each of the prior art embodiments, a separate Exhaust Gas Recirculation mixer has been utilized. Commonly, the mixer exists as a separate cast pipe, which is attached directly to the intake manifold of the internal combustion reciprocating engine. As shown in U.S. Pat. No. 6,786,210, the mixer may be integrated with, or take the place of, the pipe or conduit that would connect the outlet of the turbocharger compressor to the inlet of the Charge Air Cooler. In both prior art embodiments, the Exhaust Gas Recirculation mixer constituted an additional and costly manufactured component, requiring additional installation, often complex underhood piping, and subjecting the intake system of the internal combustion reciprocating engine to an increased number of potential leak points.

The present invention takes advantage of the unique incremental tooling opportunities associated with the inlet, inlet manifold, outlet, and outlet manifold of the Charge Air Cooler by incorporating the Exhaust Gas Recirculation mixer directly into one of these components of the Charge Air Cooler. Specifically, the Exhaust Gas Recirculation mixer may be integrated into the outlet or outlet manifold of the Charge Air Cooler and used in conjunction with a conventional exhaust gas to engine coolant heat exchanger, or the Exhaust Gas Recirculation mixer may be integrated into the inlet or inlet manifold of the Charge Air Cooler and used without a conventional exhaust gas to engine coolant heat exchanger. Further, contrary to the teachings of the prior art, the Exhaust Gas Recirculation mixer may be integrated into the inlet or inlet manifold of the Charge Air Cooler and used in conjunction with a conventional exhaust gas to engine coolant heat exchanger. In such configuration the Charge Air Cooler may rely upon stainless steel or other corrosion resistant metal alloy construction to withstand, or a bypass circuit to prevent, condensation of corrosive combustion byproducts.

The present invention may be used in conjunction with an Exhaust Gas Recirculation control valve located in the exhaust manifold of the engine, or it may incorporate an Exhaust Gas Recirculation control valve into the integrated Exhaust Gas Recirculation mixer. The integrated Exhaust Gas Recirculation mixer in the Charge Air Cooler inlet, inlet manifold, outlet, or outlet manifold may incorporate a venturi, or it may rely instead on the backpressure of the of the exhaust gas prior to expansion in the turbocharger turbine to provide the necessary flow. Whether used in the inlet, inlet manifold, outlet, or the outlet manifold of the Charge Air Cooler, with or without a conventional exhaust gas to engine coolant heat exchanger, or with or without an Exhaust Gas Recirculation control valve, the present invention simplifies the process of manufacturing vehicles having an Exhaust Gas Recirculation mixer. The overall cost of the vehicle is reduced, as the mixer as a separate component is eliminated. Routing flexibility is further improved, which routing flexibility represents an important consideration in the congested underhood environment. The integrated Exhaust Gas Recirculation mixer may be cast into or stamped into the Charge Air Cooler inlet, inlet manifold, outlet, or outlet manifold. Alternately, it may be a welded assembly.

BRIEF DESCRIPTION OF THE DRAWINGS

FIG. 10b—A view of a thirteenth embodiment of the present invention.

FIG. 10c—A view of a fourteenth embodiment of the present invention.

DESCRIPTION OF THE INVENTION

Figure 1:
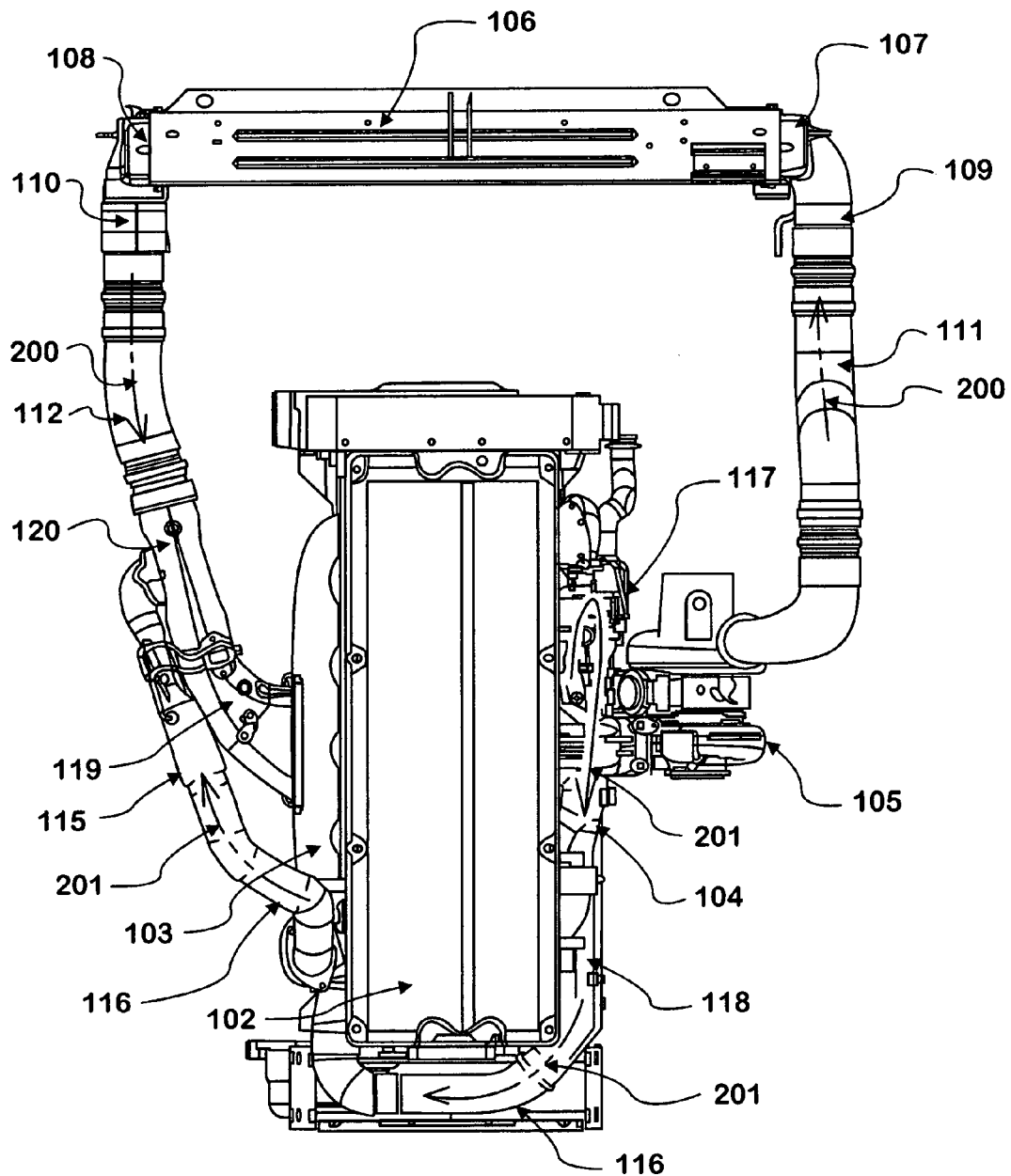
FIG. 1—Prior art engine intake system with Charge Air Cooler, Exhaust Gas Recirculation, and Exhaust Gas Recirculation mixer.

FIG. 1 shows an engine 102 having a charge air cooler 106 and a prior art exhaust gas recirculation system 115. The engine 102 is provided with an engine intake manifold 103 and an engine exhaust manifold 104, to which engine exhaust manifold 104 is attached a turbocharger 105. The turbocharger 105 functions to extract mechanical energy from the exhaust 201 produced by the engine 102, and utilize the mechanical energy to compress the intake air 200, which intake air 200 is conveyed to the charge air cooler 106 by the turbo to charge air cooler pipe 111. The intake air 200 enters the charge air cooler 106 at the charge air cooler inlet 109, and is distributed evenly across the charge air cooler 106 by use of a charge air cooler inlet manifold 107. As the intake air 200 exits the charge air cooler 106, it is collected in the charge air cooler outlet manifold 108, before exiting through the charge air cooler outlet 110. The intake air 200 is then conveyed to an exhaust gas recirculation mixer 119 by a charge air cooler to intake pipe 112. The exhaust gas recirculation mixer 119 is typically attached directly to the engine intake manifold 103, and incorporates a venturi 120. The exhaust gas recirculation system 115, then, is provided with an exhaust gas recirculation pipe 116, an exhaust gas recirculation control valve 117, an exhaust gas recirculation gas to coolant heat exchanger 118, and the aforementioned exhaust gas recirculation mixer 119. Some of the exhaust gas 201 produced by the engine 102 is allowed to exit the engine exhaust manifold 104 prior to the turbocharger 105 by the exhaust gas recirculation control valve 117, at which point it enters the exhaust gas recirculation gas to coolant heat exchanger 118. Having been reduced in temperature, the exhaust gas 201 is then conveyed to the exhaust gas recirculation mixer 119 by means of the exhaust gas recirculation pipe 116. The exhaust gas 201 is drawn into the exhaust gas recirculation mixer 119, at least partially by the venturi 120, wherein the exhaust gas 201 mixes with the intake air 200.

Figure 2:
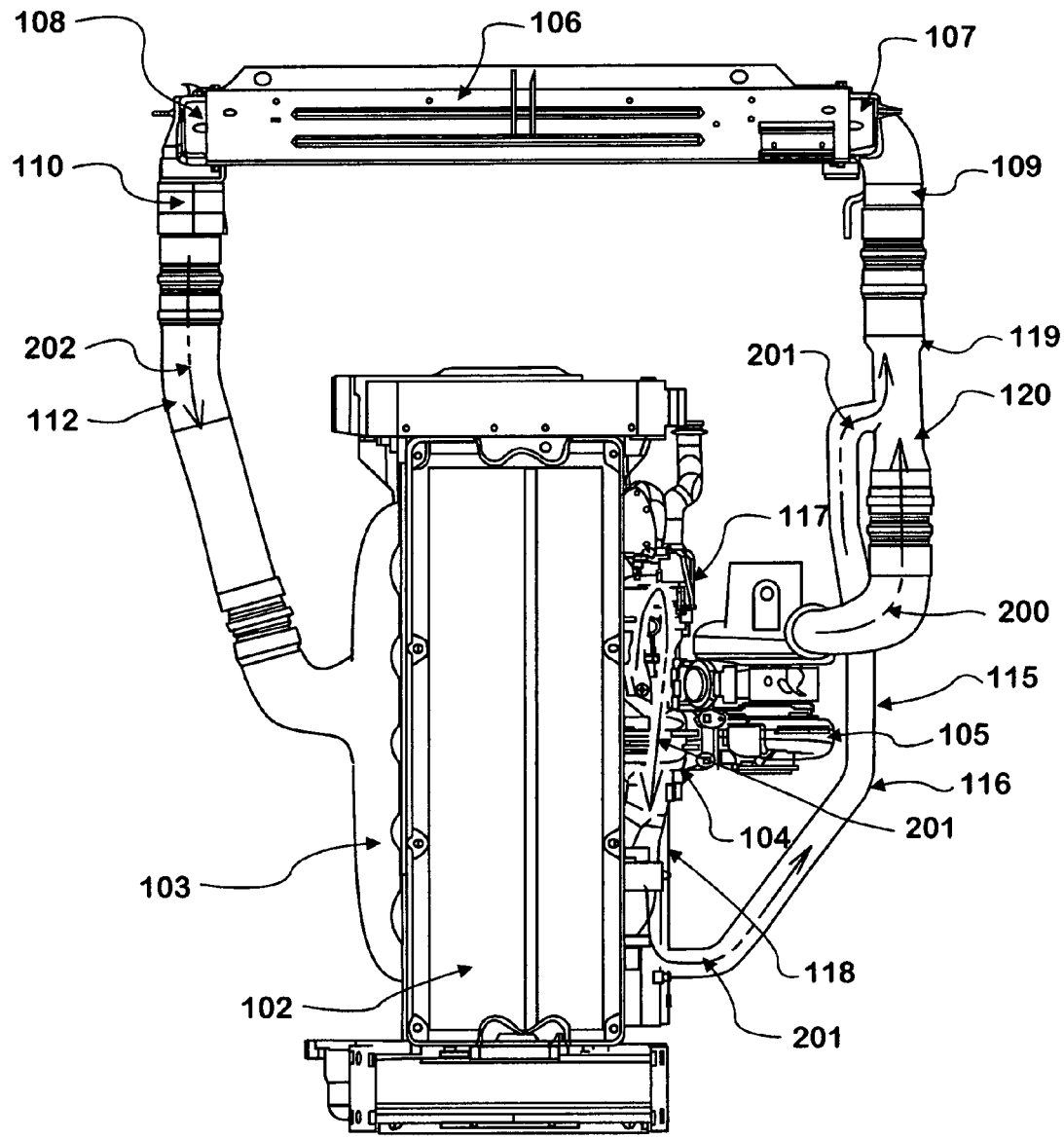
FIG. 2—Prior art engine intake system with Charge Air Cooler, Exhaust Gas Recirculation, and Exhaust Gas Recirculation mixer, with the Exhaust Gas Recirculation mixer located upstream from the Charge Air Cooler.

FIG. 2 shows an engine 102 having a charge air cooler 106 and a prior art exhaust gas recirculation system 115, similar to the engine 102 shown in FIG. 1. The engine 102 in FIG. 2 is again provided with an engine intake manifold 103 and an engine exhaust manifold 104, to which engine exhaust manifold 104 is attached a turbocharger 105. Intake air 200 flows directly from the turbocharger 105 into an exhaust gas recirculation mixer 119, which exhaust gas recirculation mixer 119 is located upstream from the charge air cooler 106, and takes the place of the turbo to charge air cooler pipe 111 (not shown). Some of the exhaust gas 201 produced by the engine 102 is allowed to exit the engine exhaust manifold 104 prior to the turbocharger 105 by the exhaust gas recirculation control valve 117. The exhaust gas 201 again passes through an exhaust gas recirculation gas to coolant heat exchanger 118, through the exhaust gas recirculation pipe 116, and to the exhaust gas recirculation mixer 119, which exhaust gas recirculation mixer 119 may incorporate a venturi 120. After mixing, the intake and exhaust air mix 202 enters the charge air cooler 106 at the charge air cooler inlet 109, and is distributed evenly across the charge air cooler 106 by use of the charge air cooler inlet manifold 107. As the intake and exhaust air mix 202 exits the charge air cooler 106, it is collected in the charge air cooler outlet manifold 108, before exiting through the charge air cooler outlet 110. The intake and exhaust air mix 202 is then conveyed to the engine intake manifold 103 by the charge air cooler to intake pipe 112.

Figure 3:
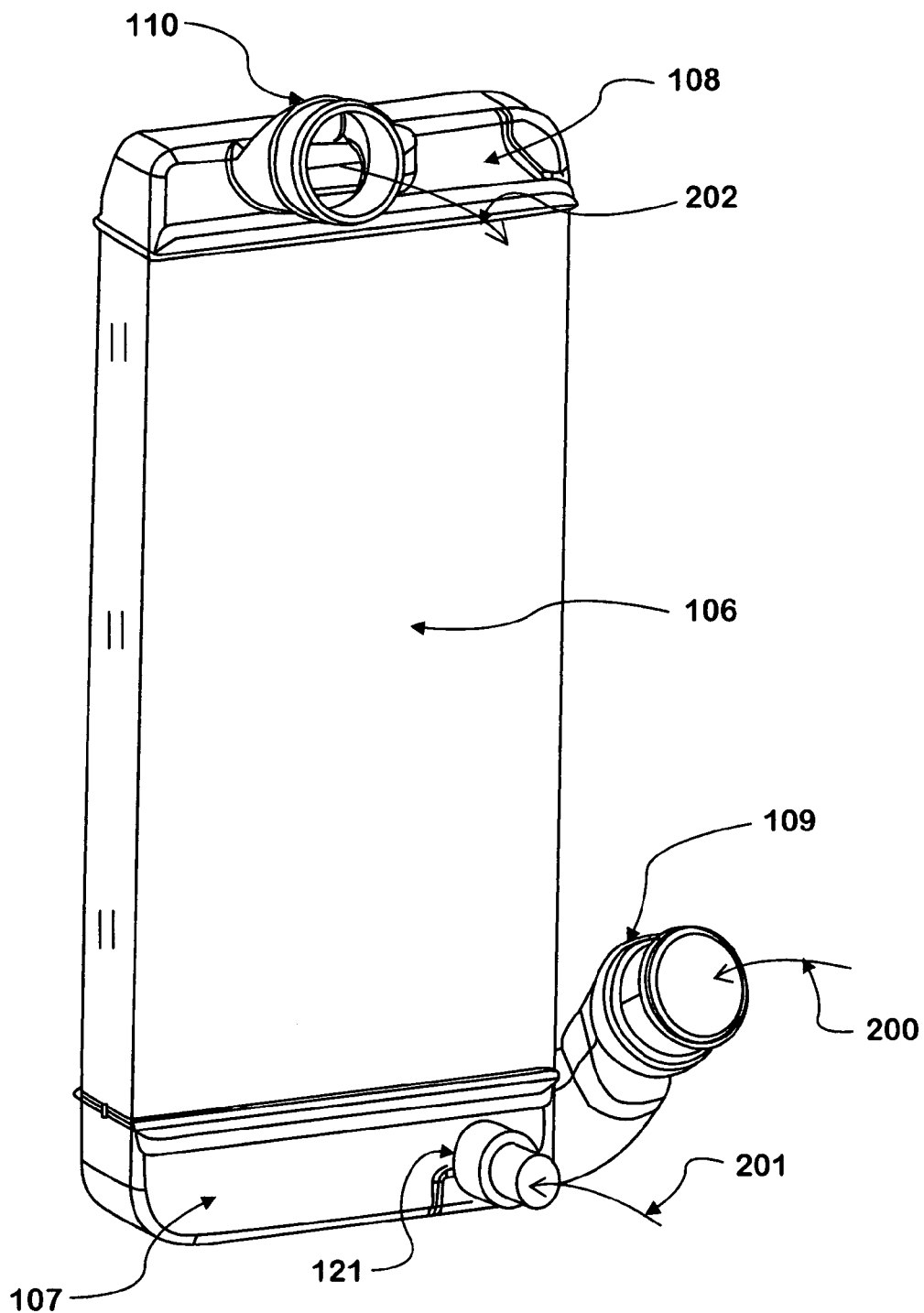
FIG. 3—A view of a first embodiment of the present invention.

FIG. 3 shows an embodiment of the present invention, specifically a charge air cooler 106, similar to the charge air coolers 106 shown in FIGS. 1 and 2, except that the charge air cooler 106 shown in FIG. 3 is oriented vertically. The vertical orientation of the charge air cooler 106 shown in FIG. 3 is of no consequence to the present invention. The charge air cooler 106 is provided with an inlet 109, an inlet manifold 107, an outlet manifold 108, and an outlet 110. The inlet manifold 107 is further provided with an integrated internal exhaust gas recirculation mixer 121. Intake air 200 enters the inlet manifold 107 at the inlet 109, and recirculation exhaust 201 enters the inlet manifold 107 at the integrated internal exhaust gas recirculation mixer 121. Mixed intake and exhaust air 202 travels through the charge air cooler 106 to be reduced in temperature, passes through the outlet manifold 108, and exits at the outlet 110.

Figure 4:
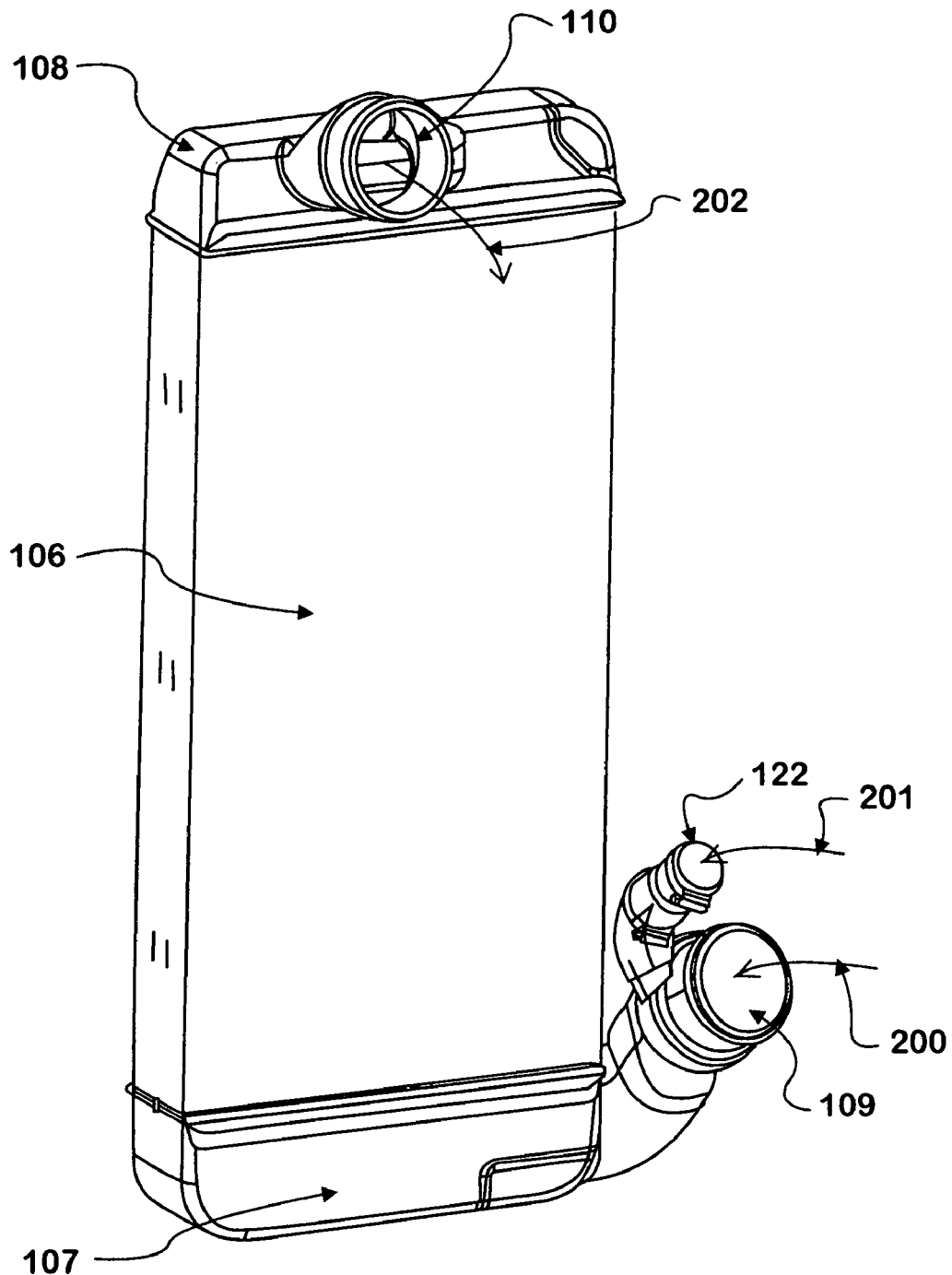
FIG. 4—A view of a second embodiment of the present invention.

FIG. 4 shows a charge air cooler 106, similar to the charge air cooler 106 shown in FIG. 3. The charge air cooler 106 shown in FIG. 4 is again provided with an inlet 109, an inlet manifold 107, an outlet manifold 108, and an outlet 110. The inlet 109 is further provided with an integrated exhaust gas recirculation mixer 122, which integrated exhaust gas recirculation mixer 122 is external to the inlet manifold 107. Intake air 200 enters the inlet 109, and recirculation exhaust 201 enters the inlet 109 at the integrated exhaust gas recirculation mixer 122. Mixed intake and exhaust air 202 travels into the inlet manifold 107, through the charge air cooler 106 to be reduced in temperature, through the outlet manifold 108, and exits at the outlet 110.

Figure 5:
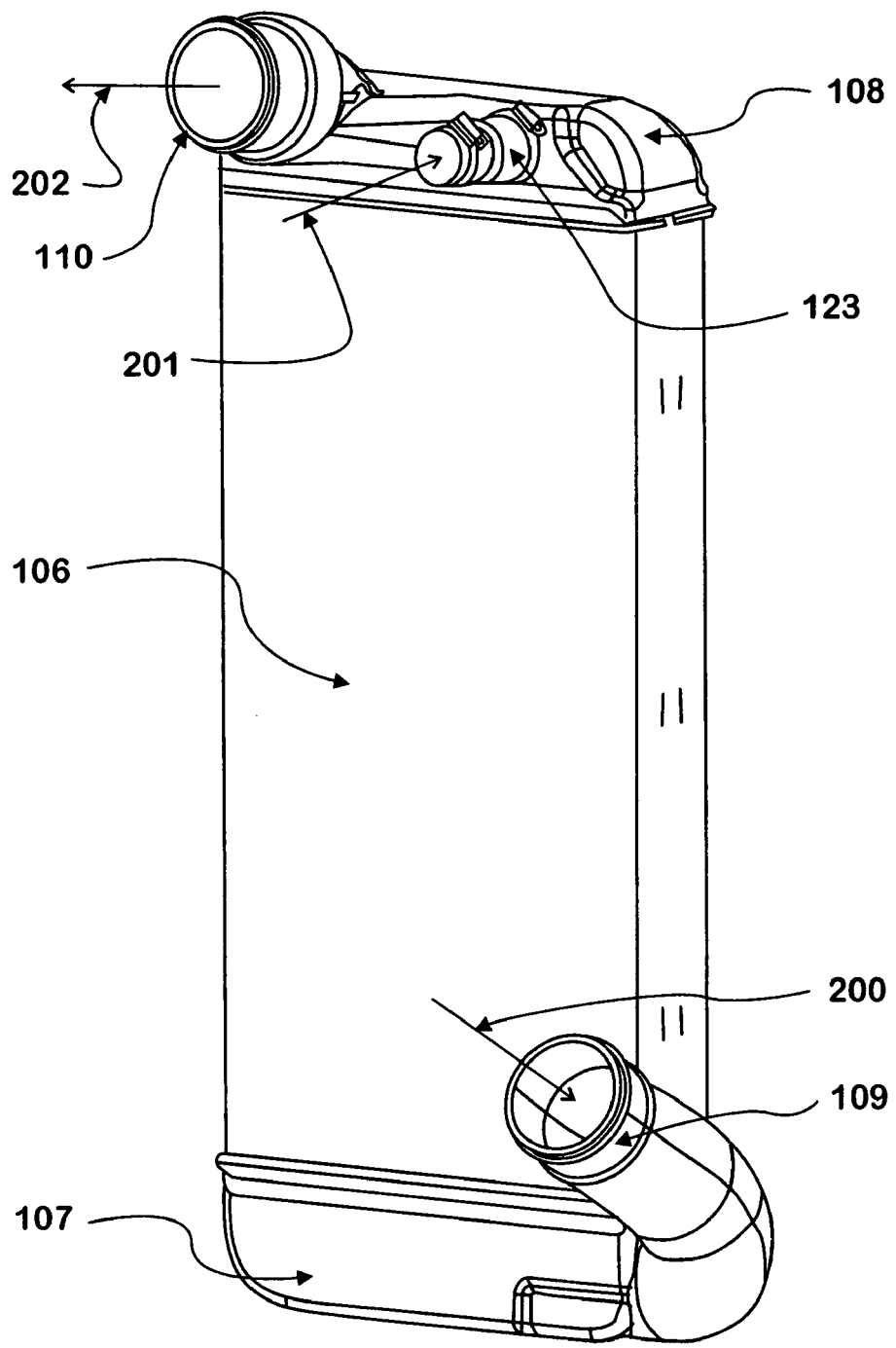
FIG. 5—A view of a third embodiment of the present invention.

FIG. 5 shows a charge air cooler 106, similar to the charge air coolers 106 shown in FIGS. 3 and 4. The charge air cooler 106 is provided with an inlet 109, an inlet manifold 107, an outlet manifold 108, and an outlet 110. The outlet manifold 108 is further provided with an integrated internal exhaust gas recirculation mixer 123. Intake air 200 enters the inlet manifold 107 at the inlet 109, travels through the charge air cooler 106 to be reduced in temperature, and enters the outlet manifold 108. Recirculation exhaust 201 also enters the outlet manifold 108, doing so at the integrated internal exhaust gas recirculation mixer 123. Mixed intake and exhaust air 202 then exits the outlet manifold 108 at the outlet 110.

Figure 6:
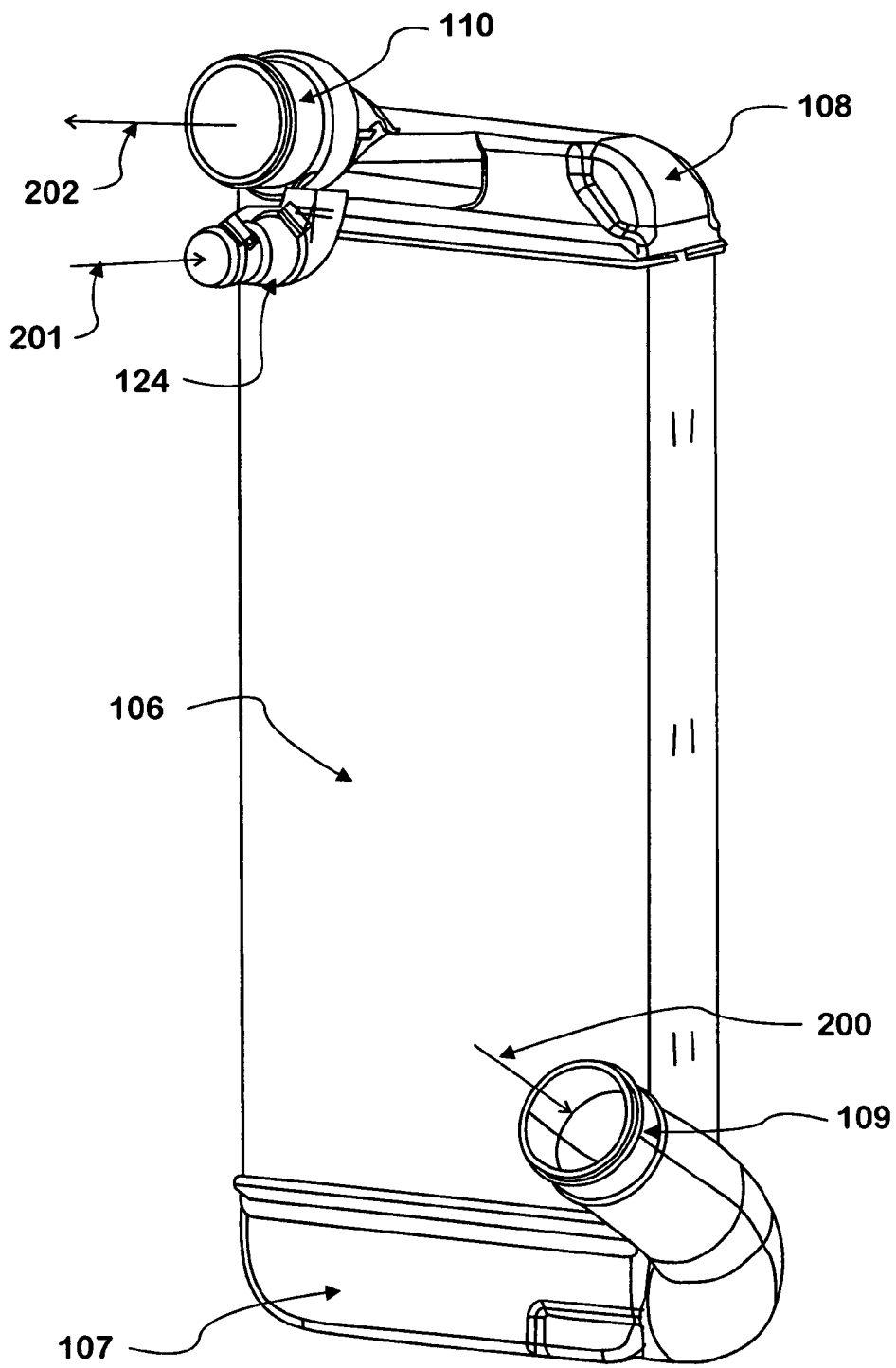
FIG. 6—A view of a fourth embodiment of the present invention.

FIG. 6 shows a charge air cooler 106, similar to the charge air coolers 106 shown in FIGS. 3, 4, and 5. The charge air cooler 106 shown in FIG. 6 is again provided with an inlet 109, an inlet manifold 107, an outlet manifold 108, and an outlet 110. The outlet 110 is further provided with an integrated exhaust gas recirculation mixer 124, which integrated exhaust gas recirculation mixer 124 is external to the outlet manifold 108. Intake air 200 enters the inlet 109, passes through the inlet manifold 107, through the charge air cooler 106, and through the outlet manifold 108. At the outlet 110, recirculation exhaust 201 enters through the integrated exhaust gas recirculation mixer 124. Mixed intake and exhaust air 202 then exits the outlet 110.

Figure 7:
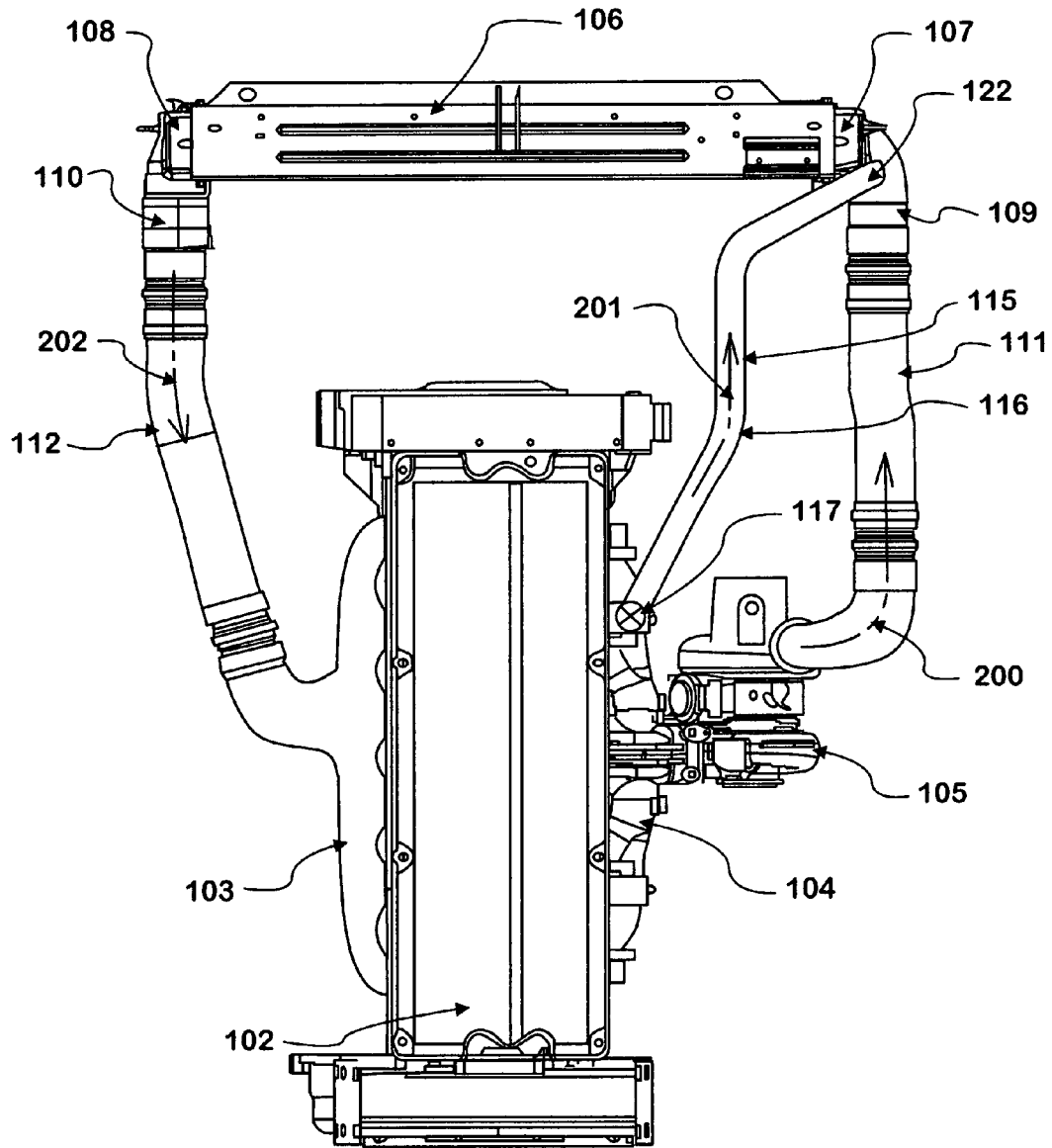
FIG. 7—A view of a fifth embodiment of the present invention.

FIG. 7 shows an engine 102 having a charge air cooler 106 and an embodiment of the present invention, specifically an exhaust gas recirculation system 115 utilizing an integrated exhaust gas recirculation mixer 122 integrated into the charge air cooler inlet 109. The engine 102 shown in FIG. 7 is provided with an engine intake manifold 103 and an engine exhaust manifold 104, to which engine exhaust manifold 104 is attached a turbocharger 105. Intake air 200 is conveyed from the turbocharger 105 to the charge air cooler inlet 109 by the turbo to charge air cooler pipe 111. Some of the exhaust gas 201 produced by the engine 102 is allowed to exit the engine exhaust manifold 104 prior to the turbocharger 105 by the exhaust gas recirculation control valve 117. The exhaust gas 201 travels through the exhaust gas recirculation pipe 116, and enters the charge air cooler inlet 109 at the integrated exhaust gas recirculation mixer 122. Mixed intake and exhaust air 202 then travels through the charge air cooler inlet manifold 107, through the charge air cooler 106, through the charge air cooler outlet manifold 108, and exits through the charge air cooler outlet 110. The mixed intake and exhaust air 202 is then conducted to the engine intake manifold 103 by the charge air cooler to intake pipe 112.

Figure 7A:
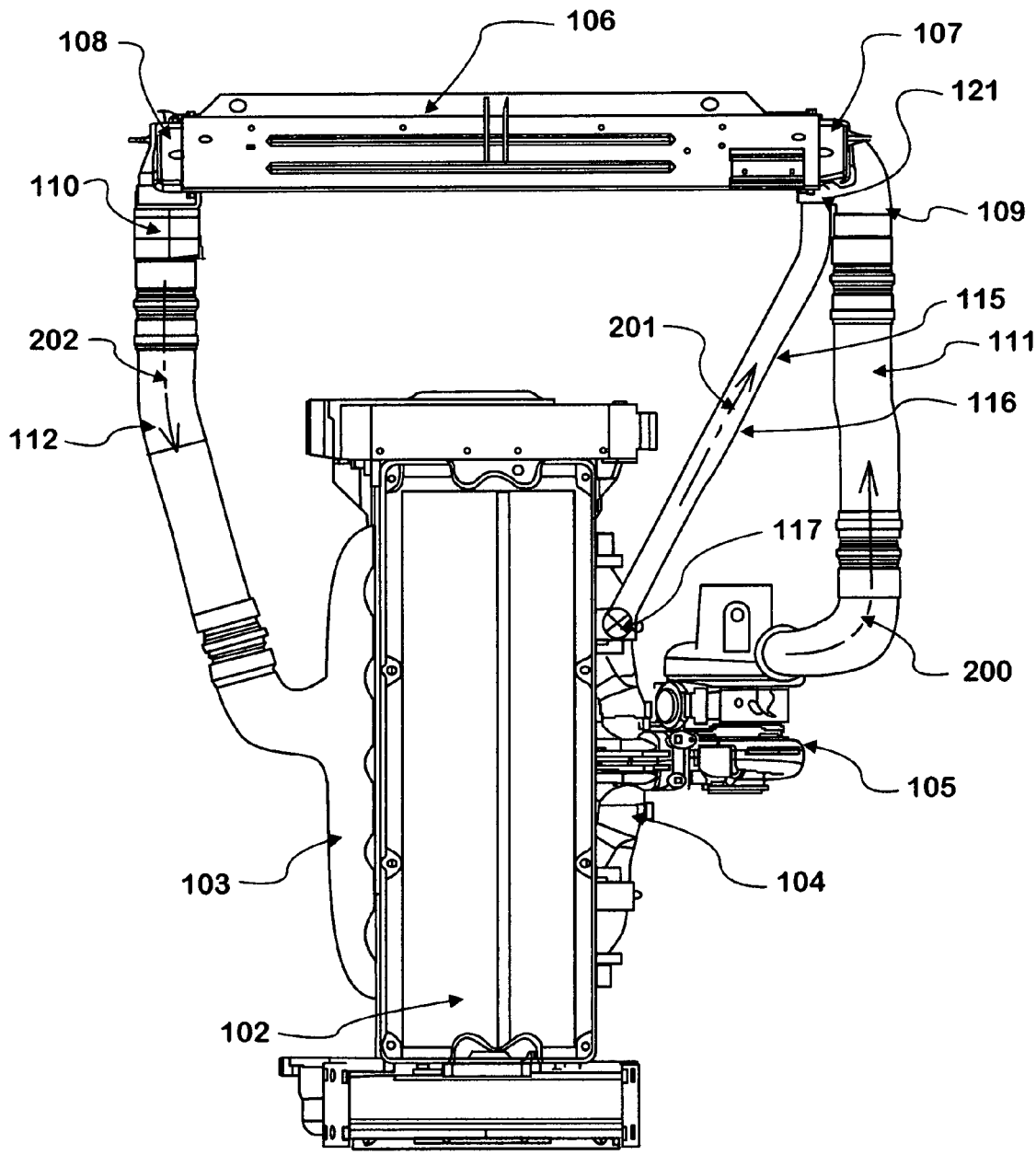
FIG. 7a—A view of a sixth embodiment of the present invention.

FIG. 7a shows an engine 102 having a charge air cooler 106 and an embodiment of the present invention, specifically an exhaust gas recirculation system 115 utilizing an integrated internal exhaust gas recirculation mixer 121 integrated into the charge air cooler inlet manifold 107. The engine 102 shown in FIG. 7a is provided with an engine intake manifold 103 and an engine exhaust manifold 104, to which engine exhaust manifold 104 is attached a turbocharger 105. Intake air 200 is conveyed from the turbocharger 105 to the charge air cooler inlet 109 by the turbo to charge air cooler pipe 111. From the charge air cooler inlet 109, the intake air 200 enters the charge air cooler inlet manifold 107. Some of the exhaust gas 201 produced by the engine 102 is allowed to exit the engine exhaust manifold 104 prior to the turbocharger 105 by the exhaust gas recirculation control valve 117. The exhaust gas 201 travels through the exhaust gas recirculation pipe 116, and enters the charge air cooler inlet manifold 107 at the integrated internal exhaust gas recirculation mixer 121. Mixed intake and exhaust air 202 then travels through the charge air cooler 106, through the charge air cooler outlet manifold 108, and exits through the charge air cooler outlet 110. The mixed intake and exhaust air 202 is then conducted to the engine intake manifold 103 by the charge air cooler to intake pipe 112.

Figure 8:
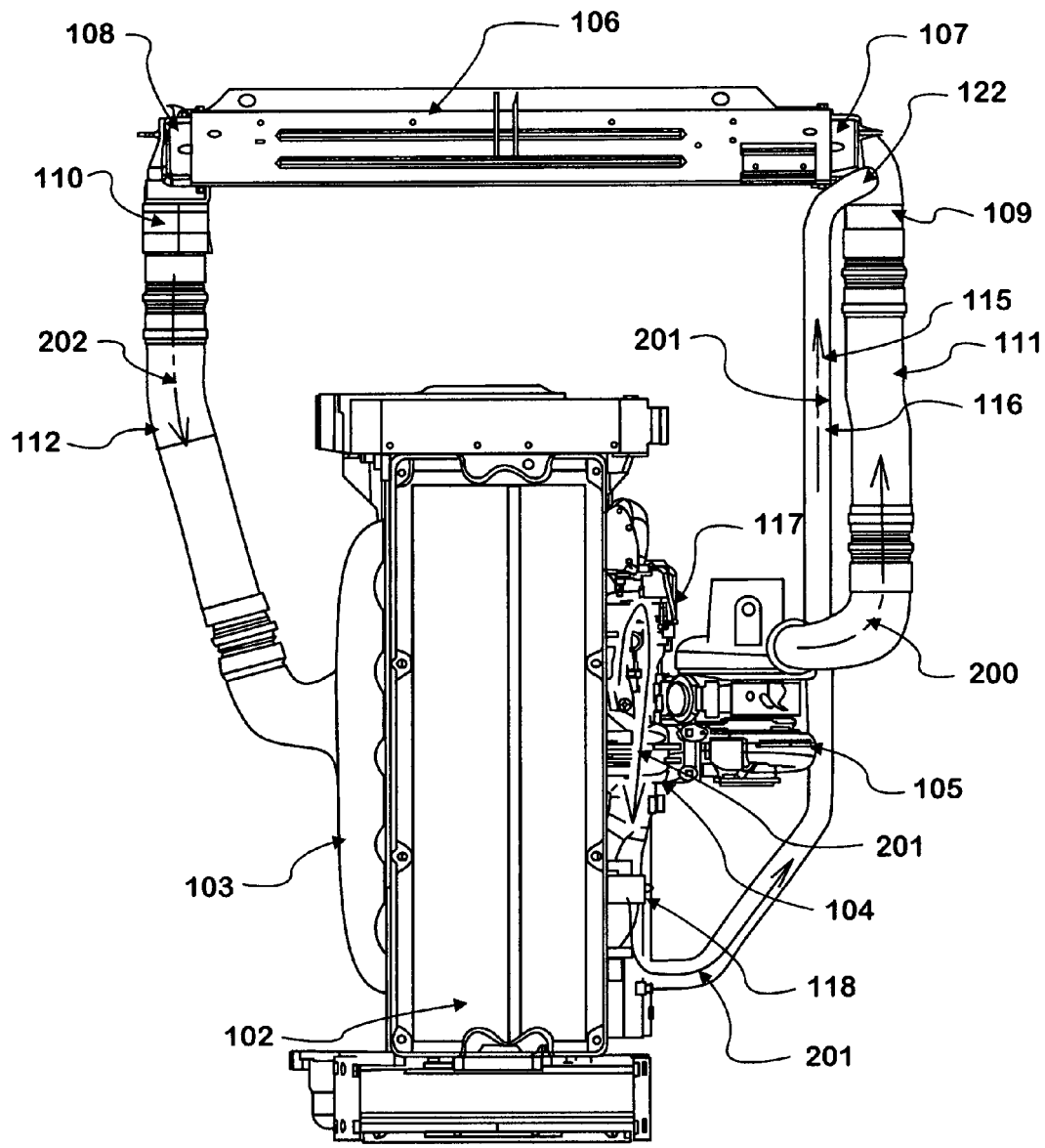
FIG. 8—A view of a seventh embodiment of the present invention.

FIG. 8 shows an engine 102 having a charge air cooler 106 and an embodiment of the present invention, specifically an exhaust gas recirculation system 115 utilizing an integrated exhaust gas recirculation mixer 122 integrated into the charge air cooler inlet 109. The engine 102 shown in FIG. 8 is provided with an engine intake manifold 103 and an engine exhaust manifold 104, to which engine exhaust manifold 104 is attached a turbocharger 105. Intake air 200 is conveyed from the turbocharger 105 to the charge air cooler inlet 109 by the turbo to charge air cooler pipe 111. Some of the exhaust gas 201 produced by the engine 102 is allowed to exit the engine exhaust manifold 104 prior to the turbocharger 105 by the exhaust gas recirculation control valve 117. The exhaust gas 201 travels through the exhaust gas recirculation gas to coolant heat exchanger 118, through the exhaust gas recirculation pipe 116, and enters the charge air cooler inlet 109 at the integrated exhaust gas recirculation mixer 122. Mixed intake and exhaust air 202 then travels through the charge air cooler inlet manifold 107, through the charge air cooler 106, through the charge air cooler outlet manifold 108, and exits through the charge air cooler outlet 110. The mixed intake and exhaust air 202 is then conducted to the engine intake manifold 103 by the charge air cooler to intake pipe 112.

Figure 8A:
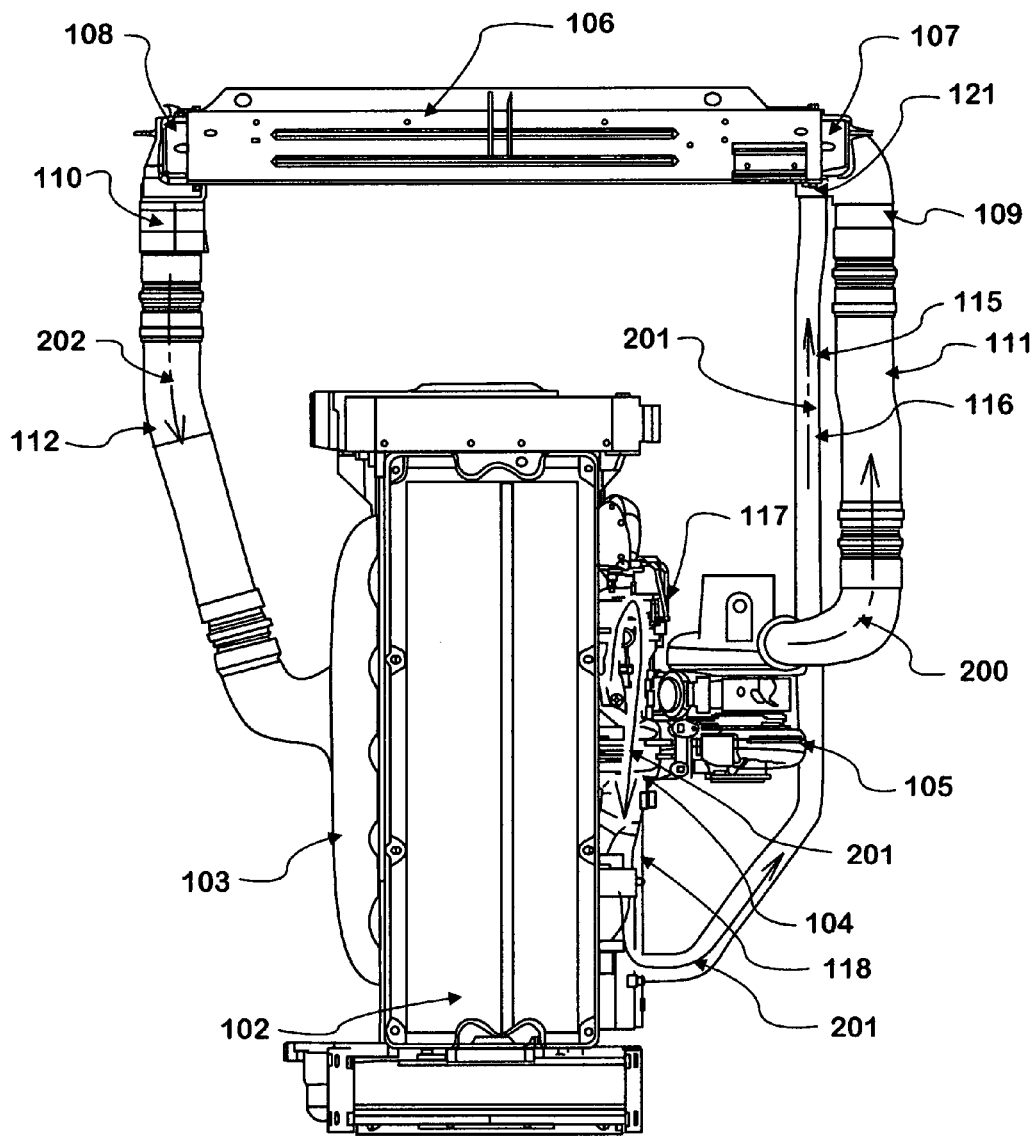
FIG. 8a—A view of an eighth embodiment of the present invention.

FIG. 8*a* shows an engine 102 having a charge air cooler 106 and an embodiment of the present invention, specifically an exhaust gas recirculation system 115 utilizing an integrated internal exhaust gas recirculation mixer 121 integrated into the charge air cooler inlet manifold 107. The engine 102 shown in FIG. 8*a* is provided with an engine intake manifold 103 and an engine exhaust manifold 104, to which engine exhaust manifold 104 is attached a turbocharger 105. Intake air 200 is conveyed from the turbocharger 105 to the charge air cooler inlet 109 by the turbo to charge air cooler pipe 111. From the charge air cooler inlet 109, the intake air 200 enters the charge air cooler inlet manifold 107. Some of the exhaust gas 201 produced by the engine 102 is allowed to exit the engine exhaust manifold 104 prior to the turbocharger 105 by the exhaust gas recirculation control valve 117. The exhaust gas 201 travels through the exhaust gas recirculation gas to coolant heat exchanger 118, through the exhaust gas recirculation pipe 116, and enters the charge air cooler inlet manifold 107 at the integrated internal exhaust gas recirculation mixer 121. Mixed intake and exhaust air 202 then travels through the charge air cooler 106, through the charge air cooler outlet manifold 108, and exits through the charge air cooler outlet 110. The mixed intake and exhaust air 202 is then conducted to the engine intake manifold 103 by the charge air cooler to intake pipe 112.

Figure 9:
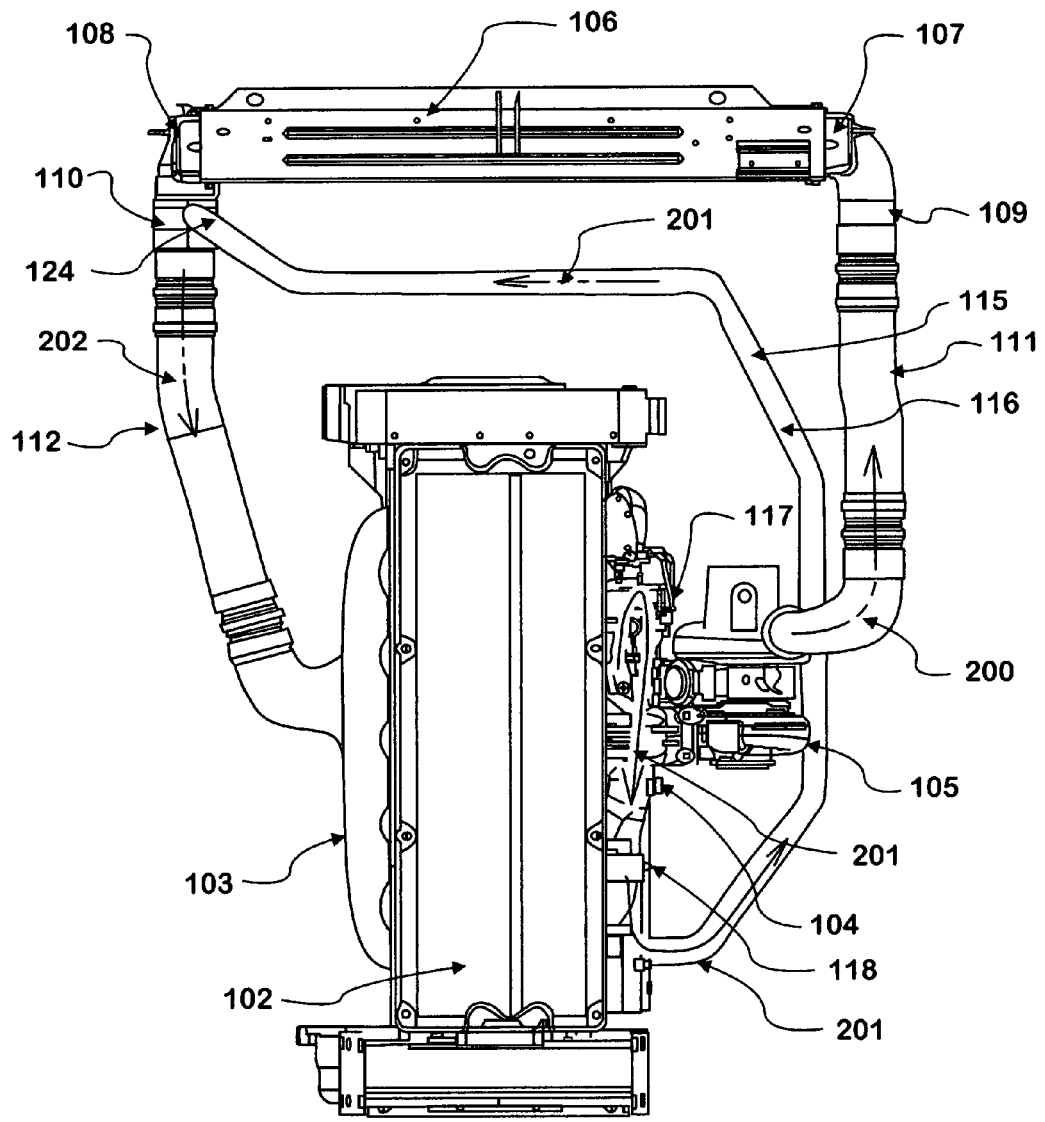
FIG. 9—A view of a ninth embodiment of the present invention.

FIG. 9 shows an engine 102 having a charge air cooler 106 and an embodiment of the present invention, specifically an exhaust gas recirculation system 115 utilizing an integrated exhaust gas recirculation mixer 124 integrated into the charge air cooler outlet 110. The engine 102 shown in FIG. 9 is provided with an engine intake manifold 103 and an engine exhaust manifold 104, to which engine exhaust manifold 104 is attached a turbocharger 105. Intake air 200 is conveyed from the turbocharger 105 to the charge air cooler inlet 109 by the turbo to charge air cooler pipe 111. The intake air 200 then travels through the charge air cooler inlet manifold 107, through the charge air cooler 106, through the charge air cooler outlet manifold 108, and exits through the charge air cooler outlet 110. Some of the exhaust gas 201 produced by the engine 102 is allowed to exit the engine exhaust manifold 104 prior to the turbocharger 105 by the exhaust gas recirculation control valve 117. The exhaust gas 201 travels through the exhaust gas recirculation gas to coolant heat exchanger 118, through the exhaust gas recirculation pipe 116, and enters the charge air cooler outlet 110 at the integrated exhaust gas recirculation mixer 124. The mixed intake and exhaust air 202 is then conducted to the engine intake manifold 103 by the charge air cooler to intake pipe 112.

Figure 9A:
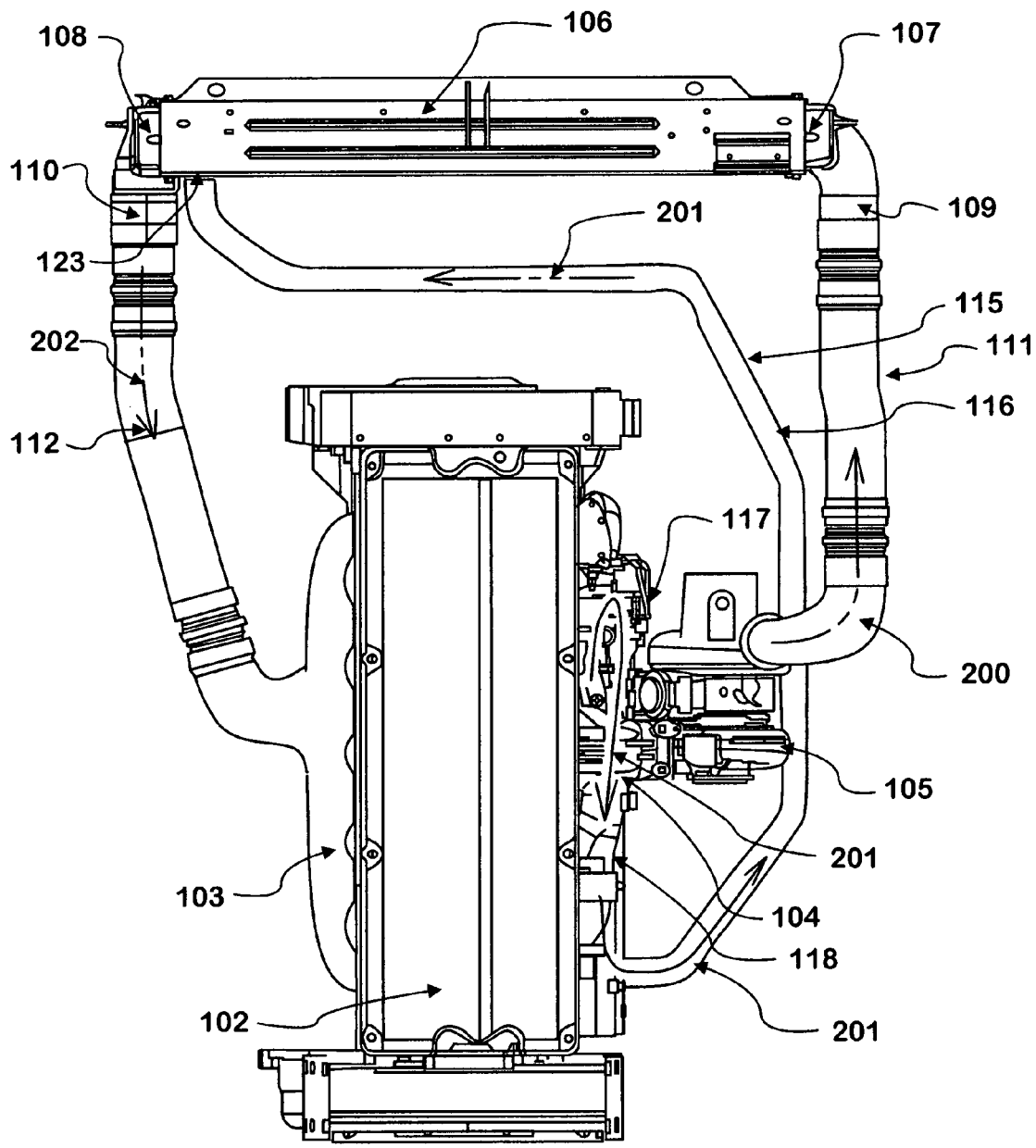
FIG. 9a—A view of a tenth embodiment of the present invention.

FIG. 9*a* shows an engine 102 having a charge air cooler 106 and an embodiment of the present invention, specifically an exhaust gas recirculation system 115 utilizing an integrated exhaust gas recirculation mixer 123 integrated into the charge air cooler outlet manifold 108. The engine 102 shown in FIG. 9*a* is provided with an engine intake manifold 103 and an engine exhaust manifold 104, to which engine exhaust manifold 104 is attached a turbocharger 105. Intake air 200 is conveyed from the turbocharger 105 to the charge air cooler inlet 109 by the turbo to charge air cooler pipe 111. The intake air 200 then travels through the charge air cooler inlet manifold 107, through the charge air cooler 106, and into the charge air cooler outlet manifold 108. Some of the exhaust gas 201 produced by the engine 102 is allowed to exit the engine exhaust manifold 104 prior to the turbocharger 105 by the exhaust gas recirculation control valve 117. The exhaust gas 201 travels through the exhaust gas recirculation gas to coolant heat exchanger 118, through the exhaust gas recirculation pipe 116, and enters the charge air cooler outlet manifold 108 at the integrated exhaust gas recirculation mixer 123. The mixed intake and exhaust air 202 then exits through the charge air cooler outlet 110, and is conducted to the engine intake manifold 103 by the charge air cooler to intake pipe 112.

Figure 10:
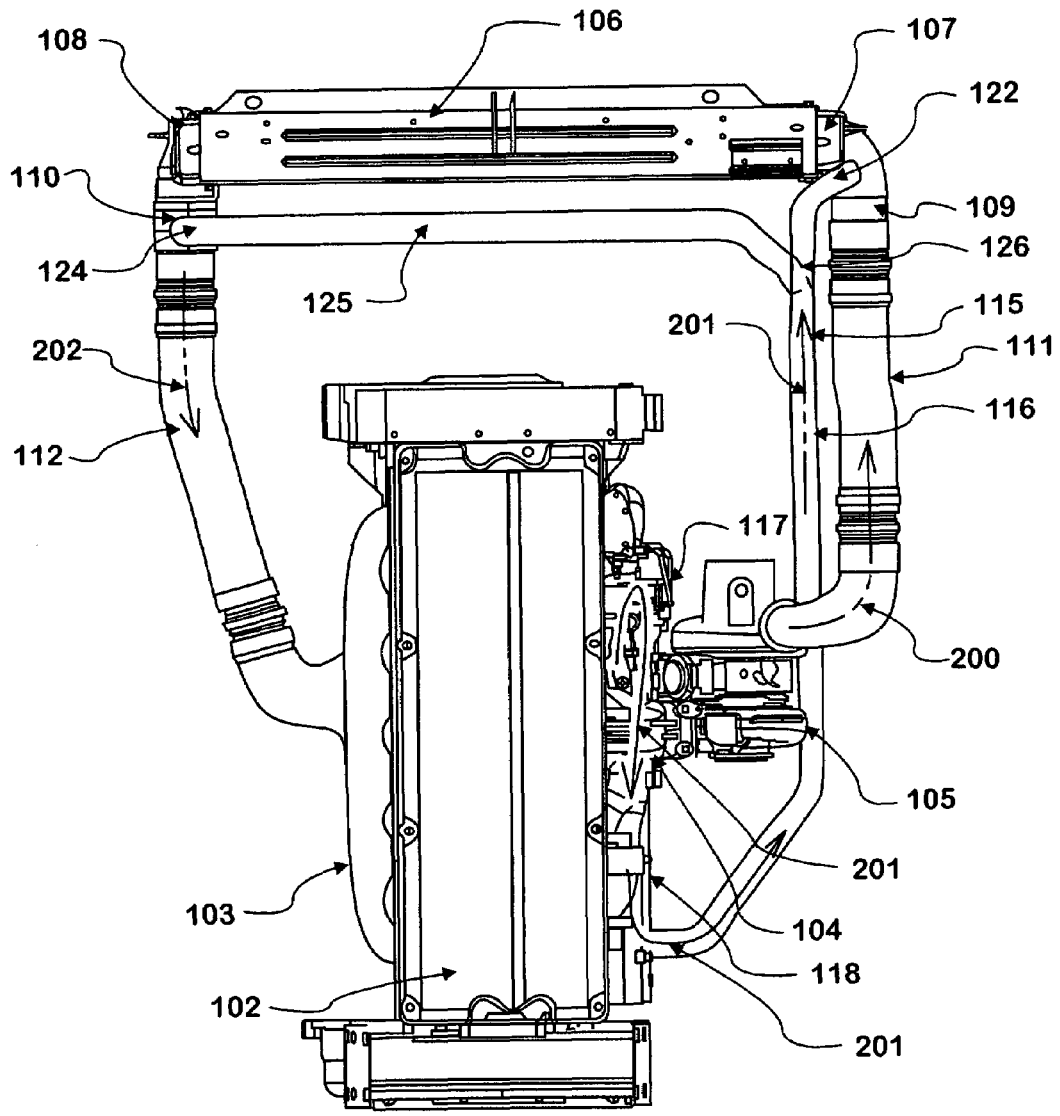
FIG. 10—A view of an eleventh embodiment of the present invention.

FIG. 10 shows an engine 102 having a charge air cooler 106 and an embodiment of the present invention, specifically an exhaust gas recirculation system 115 utilizing an integrated exhaust gas recirculation mixer 122 integrated into the charge air cooler inlet 109, an exhaust gas recirculation charge air cooler bypass pipe 125, and another integrated exhaust gas recirculation mixer 124 integrated into the charge air cooler outlet 110. The engine 102 shown in FIG. 10 is provided with an engine intake manifold 103 and an engine exhaust manifold 104, to which engine exhaust manifold 104 is attached a turbocharger 105. Intake air 200 is conveyed from the turbocharger 105 to the charge air cooler inlet 109 by the turbo to charge air cooler pipe 111. Some of the exhaust gas 201 produced by the engine 102 is allowed to exit the engine exhaust manifold 104 prior to the turbocharger 105 by the exhaust gas recirculation control valve 117. The exhaust gas 201 travels through the exhaust gas recirculation gas to coolant heat exchanger 118, through the exhaust gas recirculation pipe 116, to an exhaust gas recirculation charge air cooler bypass valve 126. From the exhaust gas recirculation charge air cooler bypass valve 126, the exhaust gas 201 may be directed to the integrated exhaust gas recirculation mixer 122 at the charge air cooler inlet 109, or the exhaust gas 201 may be directed to travel through the exhaust gas recirculation charge air cooler bypass pipe 125 to the integrated exhaust gas recirculation mixer 124 at the charge air cooler outlet 110, depending on the operating conditions of the engine 102. If the exhaust gas 201 is directed to the charge air cooler inlet 109, the mixed intake and exhaust air 202 then travels through the charge air cooler inlet manifold 107, through the charge air cooler 106, through the charge air cooler outlet manifold 108, and exits through the charge air cooler outlet 110. In both cases, the mixed intake and exhaust air 202 is then conducted to the engine intake manifold 103 by the charge air cooler to intake pipe 112.

Figure 10A:
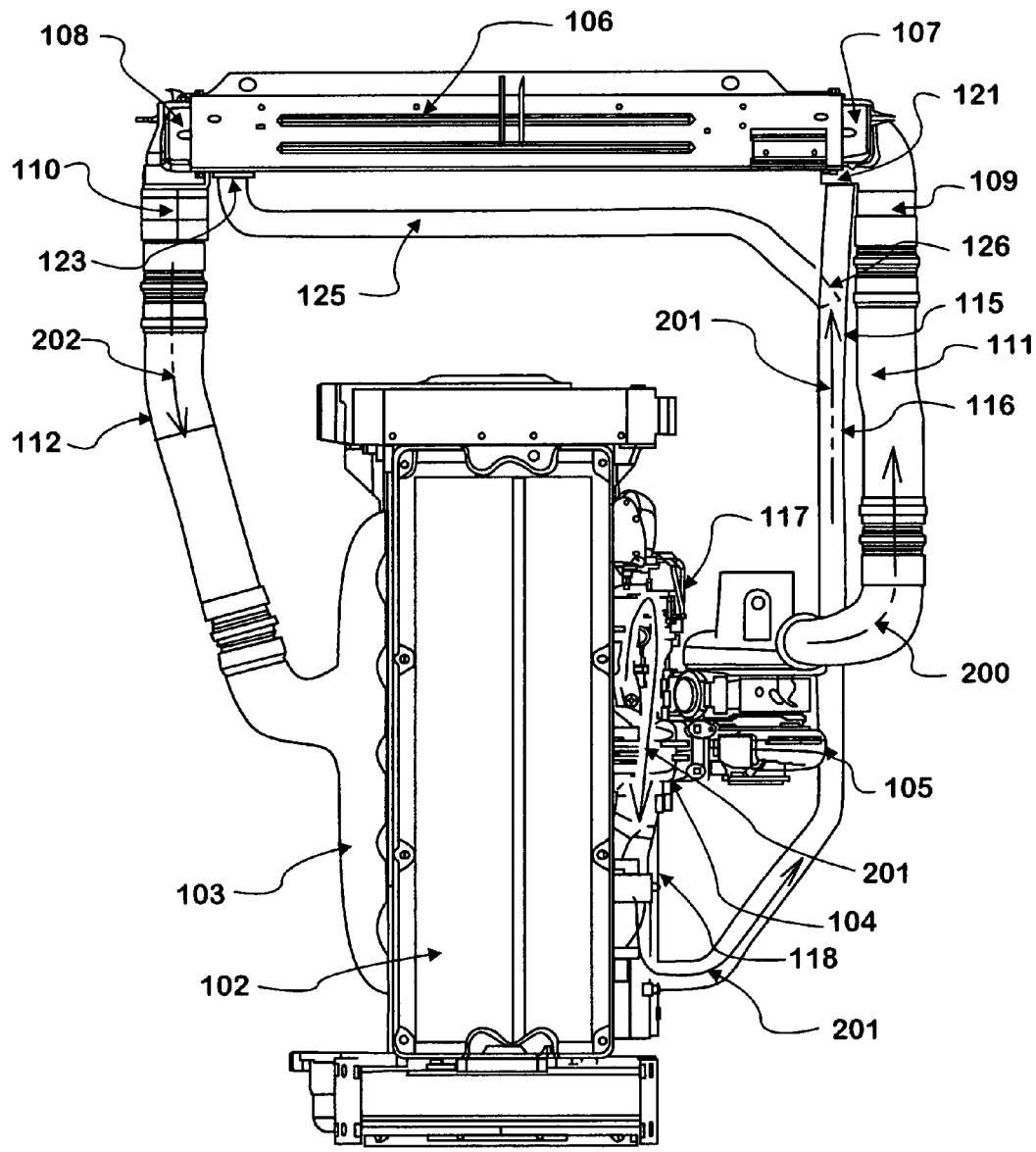
FIG. 10a—A view of a twelfth embodiment of the present invention.

FIG. 10*a* shows an engine 102 having a charge air cooler 106 and an embodiment of the present invention, specifically an exhaust gas recirculation system 115 utilizing an integrated internal exhaust gas recirculation mixer 121 integrated into the charge air cooler inlet manifold 107, an exhaust gas recirculation charge air cooler bypass pipe 125, and another integrated exhaust gas recirculation mixer 123 integrated into the charge air cooler outlet manifold 108. The engine 102 shown in FIG. 10*a* is provided with an engine intake manifold 103 and an engine exhaust manifold 104, to which engine exhaust manifold 104 is attached a turbocharger 105. Intake air 200 is conveyed from the turbocharger 105 to the charge air cooler inlet 109 by the turbo to charge air cooler pipe 111. From the charge air cooler inlet 109, the intake air 200 enters the charge air cooler inlet manifold 107. Some of the exhaust gas 201 produced by the engine 102 is allowed to exit the engine exhaust manifold 104 prior to the turbocharger 105 by the exhaust gas recirculation control valve 117. The exhaust gas 201 travels through the exhaust gas recirculation gas to coolant heat exchanger 118, through the exhaust gas recirculation pipe 116, to an exhaust gas recirculation charge air cooler bypass valve 126. From the exhaust gas recirculation charge air cooler bypass valve 126, the exhaust gas 201 may be directed to the integrated exhaust gas recirculation mixer 121 at the charge air cooler inlet manifold 107, or the exhaust gas 201 may be directed to travel through the exhaust gas recirculation charge air cooler bypass pipe 125 to the integrated exhaust gas recirculation mixer 123 at the charge air cooler outlet manifold 108, depending on the operating conditions of the engine 102. If the exhaust gas 201 is directed to the charge air cooler inlet manifold 107, the mixed intake and exhaust air 202 then travels through the charge air cooler 106, and enters the charge air cooler outlet manifold 108. In both cases, the mixed intake and exhaust air 202 then exits the charge air cooler 106 at the charge air cooler outlet 110, and is then conducted to the engine intake manifold 103 by the charge air cooler to intake pipe 112.

Figure 10B:
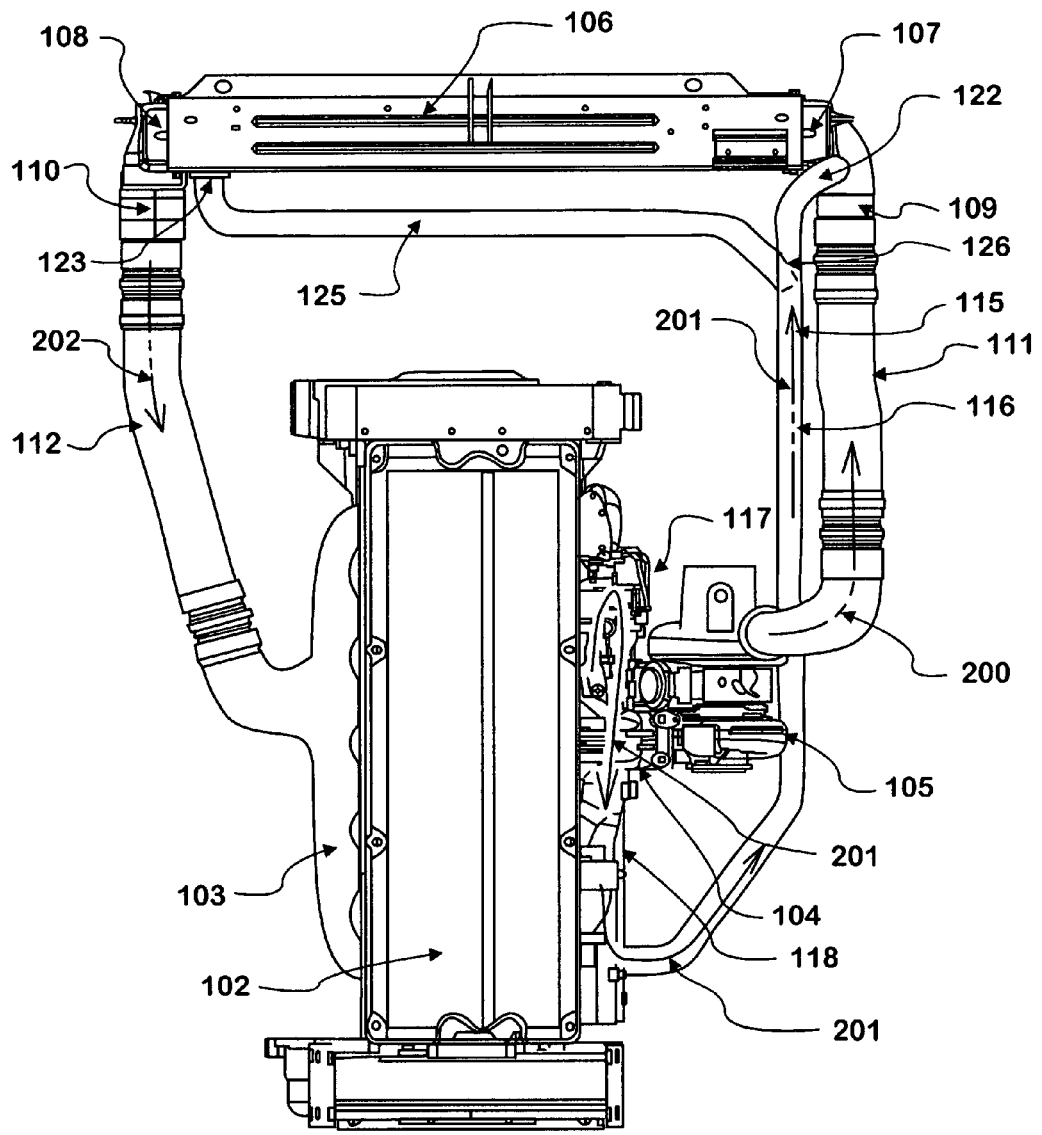

FIG. 10b shows an engine 102 having a charge air cooler 106 and an embodiment of the present invention, specifically an exhaust gas recirculation system 115 utilizing an integrated exhaust gas recirculation mixer 122 integrated into the charge air cooler inlet 109, an exhaust gas recirculation charge air cooler bypass pipe 125, and another integrated exhaust gas recirculation mixer 123 integrated into the charge air cooler outlet manifold 108. The engine 102 shown in FIG. 10b is provided with an engine intake manifold 103 and an engine exhaust manifold 104, to which engine exhaust manifold 104 is attached a turbocharger 105. Intake air 200 is conveyed from the turbocharger 105 to the charge air cooler inlet 109 by the turbo to charge air cooler pipe 111. Some of the exhaust gas 201 produced by the engine 102 is allowed to exit the engine exhaust manifold 104 prior to the turbocharger 105 by the exhaust gas recirculation control valve 117. The exhaust gas 201 travels through the exhaust gas recirculation gas to coolant heat exchanger 118, through the exhaust gas recirculation pipe 116, to an exhaust gas recirculation charge air cooler bypass valve 126. From the exhaust gas recirculation charge air cooler bypass valve 126, the exhaust gas 201 may be directed to the integrated exhaust gas recirculation mixer 122 at the charge air cooler inlet 109, or the exhaust gas 201 may be directed to travel through the exhaust gas recirculation charge air cooler bypass pipe 125 to the integrated exhaust gas recirculation mixer 123 at the charge air cooler outlet manifold 108, depending on the operating conditions of the engine 102. If the exhaust gas 201 is directed to the charge air cooler inlet 109, the mixed intake and exhaust air 202 then travels through the charge air cooler inlet manifold 107, through the charge air cooler 106, to the charge air cooler outlet manifold 108. In both cases, the mixed intake and exhaust air 202 then exits the charge air cooler 106 through the charge air cooler outlet 110, and is then conducted to the engine intake manifold 103 by the charge air cooler to intake pipe 112.

Figure 10C:
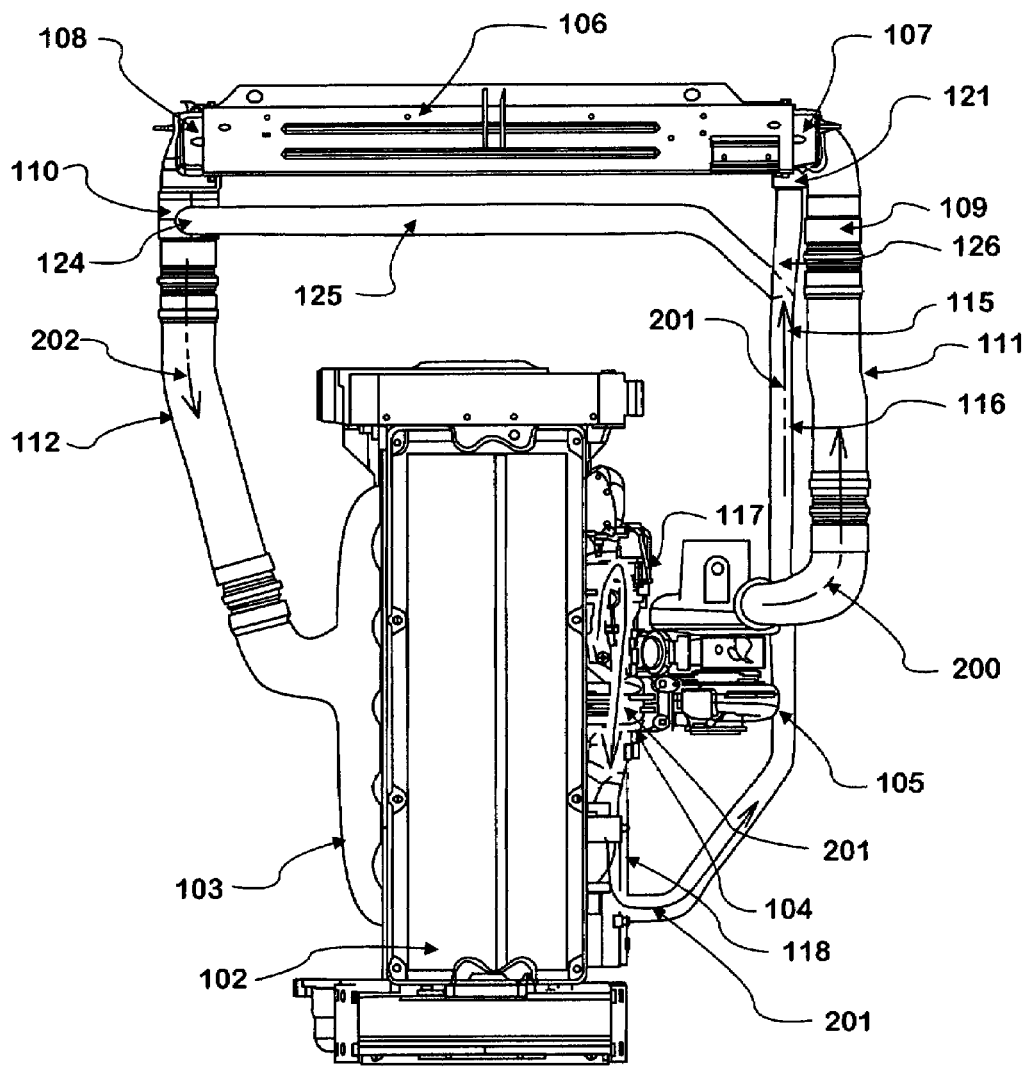

FIG. 10c shows an engine 102 having a charge air cooler 106 and an embodiment of the present invention, specifically an exhaust gas recirculation system 115 utilizing an integrated internal exhaust gas recirculation mixer 121 integrated into the charge air cooler inlet manifold 107, an exhaust gas recirculation charge air cooler bypass pipe 125, and another integrated exhaust gas recirculation mixer 124 integrated into the charge air cooler outlet 110. The engine 102 shown in FIG. 10c is provided with an engine intake manifold 103 and an engine exhaust manifold 104, to which engine exhaust manifold 104 is attached a turbocharger 105. Intake air 200 is conveyed from the turbocharger 105 to the charge air cooler inlet 109 by the turbo to charge air cooler pipe 111. From the charge air cooler inlet 109, the intake air 200 enters the charge air cooler inlet manifold 107. Some of the exhaust gas 201 produced by the engine 102 is allowed to exit the engine exhaust manifold 104 prior to the turbocharger 105 by the exhaust gas recirculation control valve 117. The exhaust gas 201 travels through the exhaust gas recirculation gas to coolant heat exchanger 118, through the exhaust gas recirculation pipe 116, to an exhaust gas recirculation charge air cooler bypass valve 126. From the exhaust gas recirculation charge air cooler bypass valve 126, the exhaust gas 201 may be directed to the integrated exhaust gas recirculation mixer 121 at the charge air cooler inlet manifold 107, or the exhaust gas 201 may be directed to travel through the exhaust gas recirculation charge air cooler bypass pipe 125 to the integrated exhaust gas recirculation mixer 124 at the charge air cooler outlet 110, depending on the operating conditions of the engine 102. If the exhaust gas 201 is directed to the charge air cooler inlet manifold 107, the mixed intake and exhaust air 202 then travels through the charge air cooler 106, through the charge air cooler outlet manifold 108, to the charge air cooler outlet 110. In both cases, the mixed intake and exhaust air 202 is then conducted to the engine intake manifold 103 by the charge air cooler to intake pipe 112.

Figure 11:
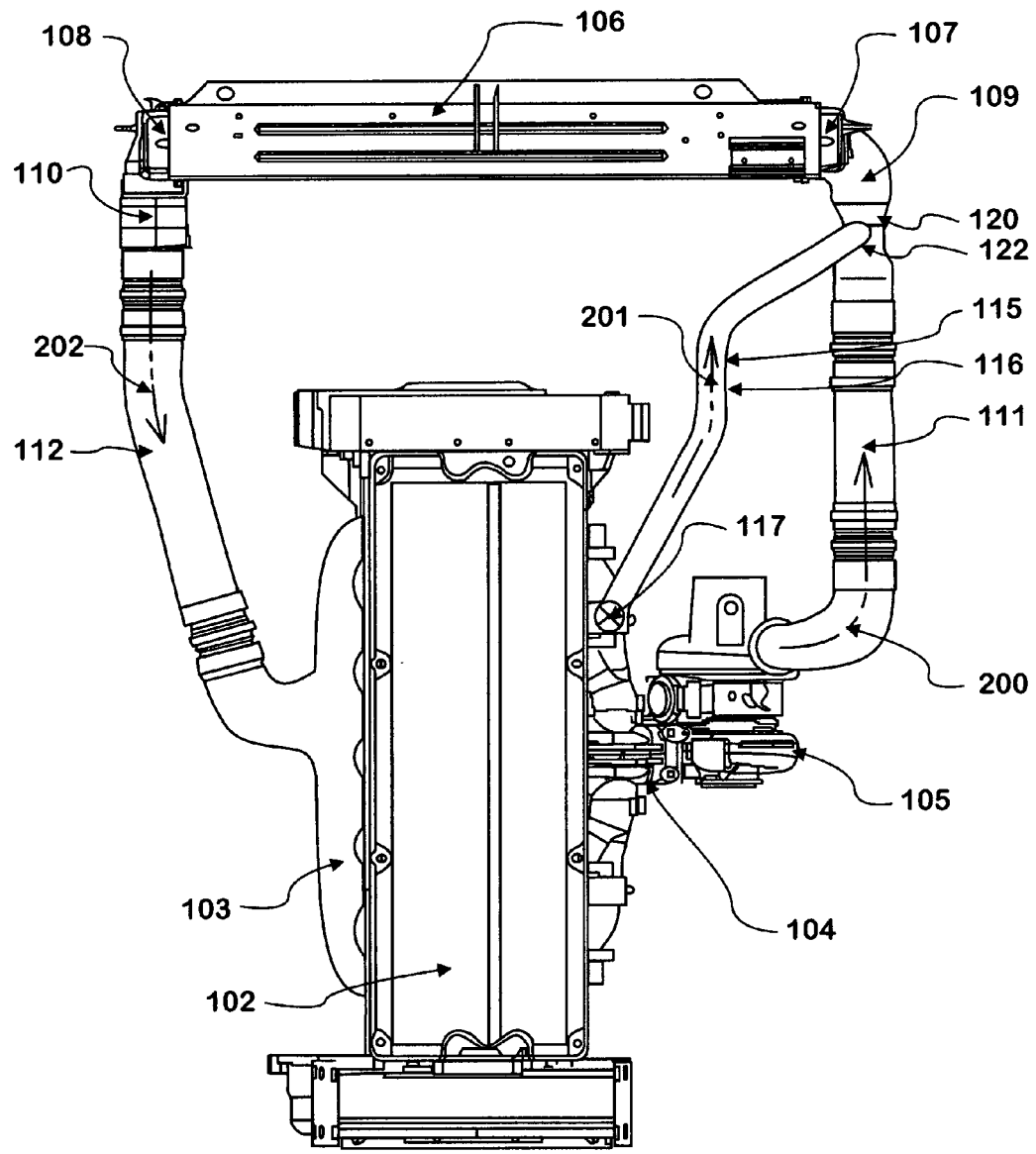
FIG. 11—A view of a fifteenth embodiment of the present invention.

FIG. 11 shows an engine 102 having a charge air cooler 106 and an embodiment of the present invention, specifically an exhaust gas recirculation system 115 utilizing an integrated exhaust gas recirculation mixer 122 and a venturi 120 integrated into the charge air cooler inlet 109. The engine 102 shown in FIG. 11 is provided with an engine intake manifold 103 and an engine exhaust manifold 104, to which engine exhaust manifold 104 is attached a turbocharger 105. Intake air 200 is conveyed from the turbocharger 105 to the charge air cooler inlet 109 by the turbo to charge air cooler pipe 111. Some of the exhaust gas 201 produced by the engine 102 is allowed to exit the engine exhaust manifold 104 prior to the turbocharger 105 by the exhaust gas recirculation control valve 117. The exhaust gas 201 travels through the exhaust gas recirculation pipe 116, and enters the venturi 120 of the charge air cooler inlet 109 at the integrated exhaust gas recirculation mixer 122. Mixed intake and exhaust air 202 then travels through the charge air cooler inlet manifold 107, through the charge air cooler 106, through the charge air cooler outlet manifold 108, and exits through the charge air cooler outlet 110. The mixed intake and exhaust air 202 is then conducted to the engine intake manifold 103 by the charge air cooler to intake pipe 112.

Figure 12:
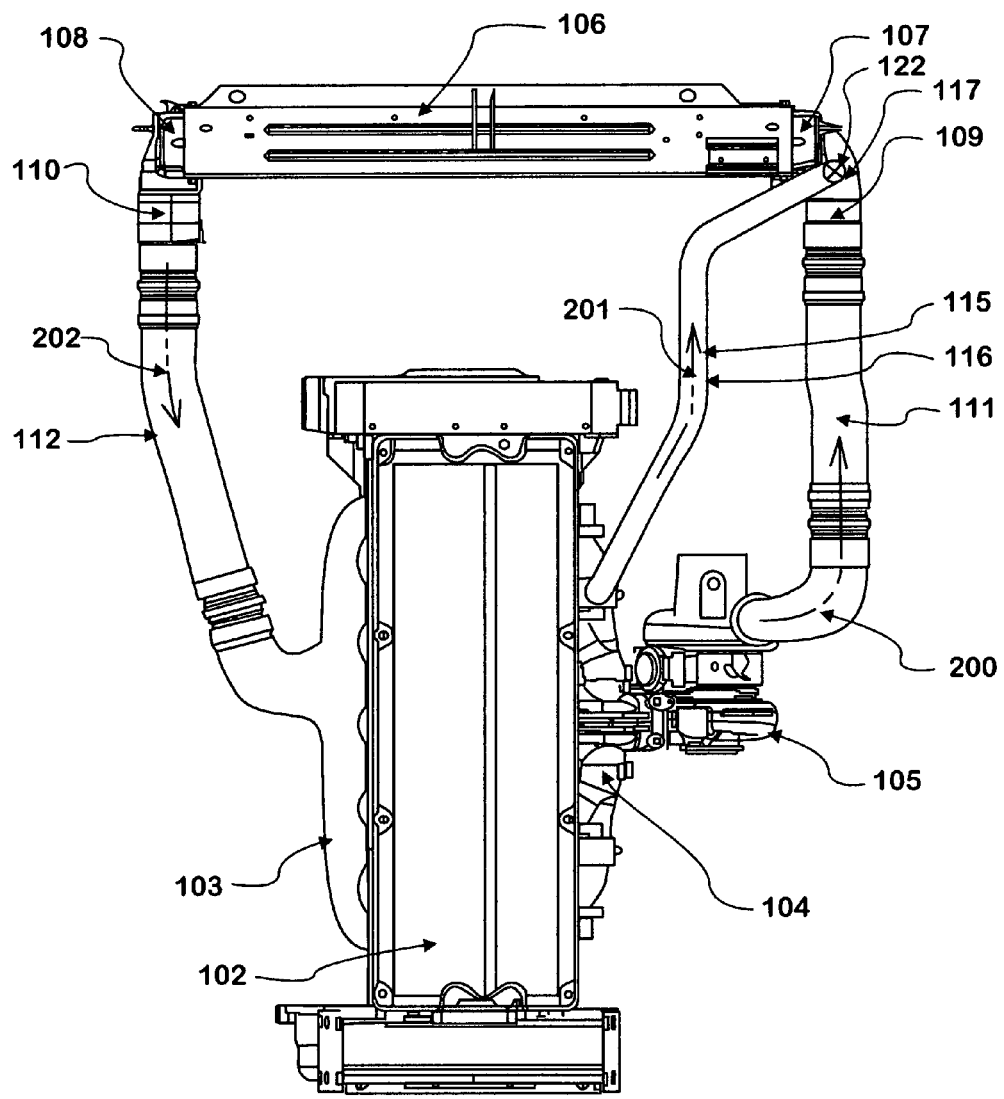
FIG. 12—A view of a sixteenth embodiment of the present invention.

FIG. 12 shows an engine 102 having a charge air cooler 106 and an embodiment of the present invention, specifically an exhaust gas recirculation system 115 utilizing an integrated exhaust gas recirculation mixer 122 and an exhaust gas recirculation control valve 117 integrated into the charge air cooler inlet 109. The engine 102 shown in FIG. 12 is provided with an engine intake manifold 103 and an engine exhaust manifold 104, to which engine exhaust manifold 104 is attached a turbocharger 105. Intake air 200 is conveyed from the turbocharger 105 to the charge air cooler inlet 109 by the turbo to charge air cooler pipe 111. Some of the exhaust gas 201 produced by the engine 102 is allowed to exit the engine exhaust manifold 104 prior to the turbocharger 105. The exhaust gas 201 travels through the exhaust gas recirculation pipe 116, and is allowed to enter the charge air cooler inlet 109 at the integrated exhaust gas recirculation mixer 122 by the exhaust gas recirculation control valve 117, depending upon the operating conditions of the engine 102. Mixed intake and exhaust air 202 then travels through the charge air cooler inlet manifold 107, through the charge air cooler 106, through the charge air cooler outlet manifold 108, and exits through the charge air cooler outlet 110. The mixed intake and exhaust air 202 is then conducted to the engine intake manifold 103 by the charge air cooler to intake pipe 112.

Other permutations of the invention are possible without departing from the teachings disclosed herein, provided that the function of the invention is to integrate a vehicle exhaust gas recirculation mixer into the inlet, inlet manifold, outlet, or outlet manifold of a vehicle charge air cooler. Other advantages to a vehicle equipped with a vehicle charge air cooler with an integrated exhaust gas recirculation mixer may also be inherent in the invention, without having been described above.

We claim:

1. A vehicle for operation on the ground, comprising:
    an engine;
    an engine intake manifold;
    an engine exhaust manifold;
    a charge air cooler having a charge air cooler inlet manifold and a charge air cooler outlet manifold;
    a charge air cooler inlet pipe fixedly attached to said charge air cooler inlet manifold;
    a charge air cooler outlet pipe fixedly attached to said charge air cooler outlet manifold;
    an exhaust gas recirculation system, said exhaust gas recirculation system having an exhaust gas recirculation mixer integrated into said charge air cooler inlet pipe, said exhaust gas recirculation mixer having a mixer inlet external to said charge air cooler inlet pipe and a mixer outlet internal to said charge air cooler inlet pipe; and
    said exhaust gas recirculation system having an exhaust gas recirculation tube in fluid communication with said engine exhaust manifold and in fluid communication with said mixer inlet of said exhaust gas recirculation mixer integrated into said charge air cooler inlet pipe.

2. A vehicle for operation on the ground,
    said vehicle having an engine, said engine having an engine intake manifold and an engine exhaust manifold, said vehicle further having a charge air cooler, said charge air cooler having a charge air cooler inlet, a charge air cooler inlet manifold, a charge air cooler outlet manifold, and a charge air cooler outlet, and said vehicle further having an exhaust gas recirculation system, said exhaust gas recirculation system comprising:
    an exhaust gas recirculation mixer integrated into said charge air cooler inlet;
    an exhaust gas recirculation pipe in fluid communication with said engine exhaust manifold and said exhaust gas recirculation mixer integrated into said charge air cooler inlet; and
    said exhaust gas recirculation system is further provided with a second exhaust gas recirculation mixer integrated into said charge air cooler outlet, an exhaust gas recirculation charge air cooler bypass valve connected to said exhaust gas recirculation pipe, and an exhaust gas recirculation charge air cooler bypass pipe in fluid communication with said exhaust gas recirculation charge air cooler bypass valve and said second exhaust gas recirculation mixer integrated into said charge air cooler outlet.

3. A vehicle for operation on the ground,
    said vehicle having an engine, said engine having an engine intake manifold and an engine exhaust manifold, said vehicle further having a charge air cooler, said charge air cooler having a charge air cooler inlet, a charge air cooler inlet manifold, a charge air cooler outlet manifold, and a charge air cooler outlet, and said vehicle further having an exhaust gas recirculation system, said exhaust gas recirculation system comprising:
    an exhaust recirculation mixer integrated into said charge air cooler inlet;
    an exhaust gas recirculation pipe in fluid communication with said engine exhaust manifold and said exhaust gas recirculation mixer integrated into said charge air cooler inlet; and
    said exhaust gas recirculation system is further provided with a second exhaust gas recirculation mixer integrated into said charge air cooler outlet manifold, an exhaust gas recirculation charge air cooler bypass valve connected to said exhaust gas recirculation pipe, and an exhaust gas recirculation charge air cooler bypass pipe in fluid communication with said exhaust gas recirculation charge air cooler bypass valve and said second exhaust gas recirculation mixer integrated into said charge air cooler outlet manifold.

4. The vehicle for operation on the ground of claim 2 or 3, wherein:
    said exhaust gas recirculation system is further provided with an exhaust gas recirculation exhaust to coolant heat exchanger, said exhaust gas recirculation exhaust to coolant heat exchanger being in fluid communication with said engine exhaust manifold and said exhaust gas recirculation pipe.

5. The vehicle for operation on the ground of claim 2 or 3, wherein:
    said exhaust gas recirculation mixer integrated into said charge air cooler inlet further incorporates an exhaust gas recirculation control valve.

6. The vehicle for operation on the ground of claim 2 or 3, wherein:
    said exhaust gas recirculation mixer integrated into said charge air cooler inlet further incorporates a venturi.

7. The vehicle for operation on the ground of claim 2 or 3, wherein:
    said charge air cooler is constructed of a corrosion resistant metal alloy.

8. The vehicle for operation on the ground of claim 2 or 3, wherein:
    said exhaust gas recirculation mixer and said charge air cooler inlet further comprise a single casting.

9. The vehicle for operation on the ground of claim 2 or 3, wherein:
    said exhaust gas recirculation mixer and said charge air cooler inlet further comprise a single weldment.

* * * * *